US012619064B2

(12) United States Patent (10) Patent No.: US 12,619,064 B2
Chen et al. (45) Date of Patent: May 5, 2026

(54) APERTURE AND APERTURE CONTROL METHOD, IMAGING LENS, AND ELECTRONIC DEVICE

(71) Applicant: HUAWEI TECHNOLOGIES CO., LTD., Shenzhen (CN)

(72) Inventors: Tingai Chen, Shenzhen (CN); Qingping Wang, Shenzhen (CN); Wangchao Ruan, Dongguan (CN); Xiaolei Chen, Hangzhou (CN); Shisheng Zheng, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 588 days.

(21) Appl. No.: 18/063,166

(22) Filed: Dec. 8, 2022

(65) Prior Publication Data

US 2023/0105861 A1 Apr. 6, 2023

Related U.S. Application Data

(63) Continuation of application No. PCT/CN2021/090338, filed on Apr. 27, 2021.

(30) Foreign Application Priority Data

Jun. 9, 2020 (CN) .......................... 202010518630.3

(51) Int. Cl.
*G02B 26/00* (2006.01)
*G03B 9/02* (2021.01)
*G03B 30/00* (2021.01)

(52) U.S. Cl.
CPC ............. *G02B 26/005* (2013.01); *G03B 9/02* (2013.01); *G03B 30/00* (2021.01)

(58) Field of Classification Search
CPC ...... G02B 5/005; G02B 26/005; G03B 7/085; G03B 9/02; G03B 30/00
(Continued)

(56) References Cited

U.S. PATENT DOCUMENTS 6,268,908 B1 7/2001 Bula et al.
7,585,122 B2 9/2009 Eromäki
(Continued)

FOREIGN PATENT DOCUMENTS

CN 101685173 A 3/2010
CN 105158934 A 12/2015
(Continued)

OTHER PUBLICATIONS

Chai-Kai Liang et al. "Programmable Aperture Photography: Multiplexed Light Field Acquisition", ACM Transactions on Graphics, vol. 27, No. 3, Article 55, Aug. 2008, total 10 pages.
(Continued)

*Primary Examiner* — Mahidere S Sahle

(57) ABSTRACT

This application describes an aperture and an aperture control method, an imaging lens, and an electronic device. The aperture includes a first substrate and a second substrate, and a first area and a second area are included between the first substrate and the second substrate. A drive electrode array on the second substrate is located in the first area, a common electrode on the second substrate is located in the second area, and the common electrode is covered by a first fluid located in the second area. The drive electrode array includes transparent drive electrodes arranged in an array. The aperture further includes a second fluid, and the second fluid covers the first fluid and the drive electrode array. The first fluid is an opaque electrolyte, the second fluid is a transparent liquid, and the first fluid is insoluble with the second fluid.

15 Claims, 34 Drawing Sheets

(58) Field of Classification Search
USPC ................................. 359/230, 249, 506, 824
See application file for complete search history.

(56) References Cited

U.S. PATENT DOCUMENTS

| | | | |
|---|---|---|---|
| 9,063,326 B2 | 6/2015 | Chang | |
| 9,759,984 B1 | 9/2017 | Xu et al. | |
| 2009/0142050 A1 | 6/2009 | Kim et al. | |
| 2010/0079838 A1* | 4/2010 | Sano ........................ | G02B 3/14 |
| | | | 359/228 |
| 2013/0038943 A1* | 2/2013 | Toko ................... | G02B 26/005 |
| | | | 359/665 |
| 2014/0168799 A1 | 6/2014 | Hubert et al. | |
| 2014/0192218 A1* | 7/2014 | Jung ..................... | G02B 5/005 |
| | | | 348/222.1 |
| 2015/0130996 A1* | 5/2015 | Chang ................. | G02B 26/004 |
| | | | 348/370 |
| 2018/0321529 A1* | 11/2018 | Osterman ........... | G02F 1/13475 |

FOREIGN PATENT DOCUMENTS

| | | | | |
|---|---|---|---|---|
| CN | 204856002 A | 12/2015 | | |
| WO | WO-2009071694 A2 * | 6/2009 | ........... | G02B 26/004 |

OTHER PUBLICATIONS

Chinese Office Action for Application No. 202010518630 dated Apr. 18, 2022, 9 pages.

* cited by examiner

01-AA'

01

| 1 | 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 |
| 1 | 1 | 1 | 1 | 1 | 0 | 0 | 0 | 0 | 0 | 0 | 1 | 1 | 1 | 1 | 1 |
| 1 | 1 | 1 | 0 | 0 | 0 | 0 | 0 | 0 | 0 | 0 | 0 | 0 | 1 | 1 | 1 |
| 1 | 1 | 1 | 0 | 0 | 0 | 0 | 0 | 0 | 0 | 0 | 0 | 0 | 1 | 1 | 1 |
| 1 | 1 | 0 | 0 | 0 | 0 | 0 | 0 | 0 | 0 | 0 | 0 | 0 | 0 | 1 | 1 |
| 1 | 1 | 0 | 0 | 0 | 0 | 0 | 0 | 0 | 0 | 0 | 0 | 0 | 0 | 1 | 1 |
| 1 | 1 | 0 | 0 | 0 | 0 | 0 | 0 | 0 | 0 | 0 | 0 | 0 | 0 | 1 | 1 |
| 1 | 1 | 0 | 0 | 0 | 0 | 0 | 0 | 0 | 0 | 0 | 0 | 0 | 0 | 1 | 1 |
| 1 | 1 | 0 | 0 | 0 | 0 | 0 | 0 | 0 | 0 | 0 | 0 | 0 | 0 | 1 | 1 |
| 1 | 1 | 0 | 0 | 0 | 0 | 0 | 0 | 0 | 0 | 0 | 0 | 0 | 0 | 1 | 1 |
| 1 | 1 | 1 | 0 | 0 | 0 | 0 | 0 | 0 | 0 | 0 | 0 | 0 | 1 | 1 | 1 |
| 1 | 1 | 1 | 0 | 0 | 0 | 0 | 0 | 0 | 0 | 0 | 0 | 0 | 1 | 1 | 1 |
| 1 | 1 | 1 | 1 | 1 | 0 | 0 | 0 | 0 | 0 | 0 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |

| 1 | 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 0 | 0 | 1 | 1 | 1 | 1 | 1 | 1 | 1 |
| 1 | 1 | 1 | 1 | 1 | 0 | 0 | 0 | 0 | 0 | 0 | 1 | 1 | 1 | 1 | 1 |
| 1 | 1 | 1 | 1 | 0 | 0 | 0 | 0 | 0 | 0 | 0 | 0 | 1 | 1 | 1 | 1 |
| 1 | 1 | 1 | 1 | 0 | 0 | 0 | 0 | 0 | 0 | 0 | 0 | 1 | 1 | 1 | 1 |
| 1 | 1 | 1 | 0 | 0 | 0 | 0 | 0 | 0 | 0 | 0 | 0 | 0 | 1 | 1 | 1 |
| 1 | 1 | 1 | 0 | 0 | 0 | 0 | 0 | 0 | 0 | 0 | 0 | 0 | 1 | 1 | 1 |
| 1 | 1 | 1 | 1 | 0 | 0 | 0 | 0 | 0 | 0 | 0 | 0 | 1 | 1 | 1 | 1 |
| 1 | 1 | 1 | 1 | 0 | 0 | 0 | 0 | 0 | 0 | 0 | 0 | 1 | 1 | 1 | 1 |
| 1 | 1 | 1 | 1 | 1 | 0 | 0 | 0 | 0 | 0 | 0 | 1 | 1 | 1 | 1 | 1 |
| 1 | 1 | 1 | 1 | 1 | 1 | 1 | 0 | 0 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |

| 1 | 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 0 | 0 | 1 | 1 | 1 | 1 | 1 | 1 | 1 |
| 1 | 1 | 1 | 1 | 1 | 1 | 0 | 0 | 0 | 0 | 1 | 1 | 1 | 1 | 1 | 1 |
| 1 | 1 | 1 | 1 | 1 | 0 | 0 | 0 | 0 | 0 | 0 | 1 | 1 | 1 | 1 | 1 |
| 1 | 1 | 1 | 1 | 1 | 0 | 0 | 0 | 0 | 0 | 0 | 1 | 1 | 1 | 1 | 1 |
| 1 | 1 | 1 | 1 | 1 | 1 | 0 | 0 | 0 | 0 | 1 | 1 | 1 | 1 | 1 | 1 |
| 1 | 1 | 1 | 1 | 1 | 1 | 1 | 0 | 0 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |

| 1 | 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|
| 1 | 1 | 0 | 0 | 0 | 0 | 1 | 1 | 1 | 1 | 0 | 0 | 0 | 0 | 1 | 1 |
| 1 | 0 | 0 | 0 | 0 | 0 | 0 | 1 | 1 | 0 | 0 | 0 | 0 | 0 | 0 | 1 |
| 1 | 0 | 0 | 0 | 0 | 0 | 0 | 0 | 0 | 0 | 0 | 0 | 0 | 0 | 0 | 1 |
| 1 | 0 | 0 | 0 | 0 | 0 | 0 | 0 | 0 | 0 | 0 | 0 | 0 | 0 | 0 | 1 |
| 1 | 0 | 0 | 0 | 0 | 1 | 1 | 1 | 1 | 1 | 1 | 0 | 0 | 0 | 0 | 1 |
| 1 | 0 | 0 | 0 | 1 | 1 | 1 | 1 | 1 | 1 | 1 | 1 | 0 | 0 | 0 | 1 |
| 1 | 0 | 0 | 0 | 1 | 1 | 0 | 0 | 0 | 0 | 1 | 1 | 0 | 0 | 0 | 1 |
| 1 | 1 | 0 | 0 | 0 | 0 | 0 | 0 | 0 | 0 | 0 | 0 | 0 | 0 | 1 | 1 |
| 1 | 1 | 0 | 0 | 0 | 0 | 0 | 0 | 0 | 0 | 0 | 0 | 0 | 0 | 1 | 1 |
| 1 | 1 | 1 | 0 | 0 | 0 | 0 | 0 | 0 | 0 | 0 | 0 | 0 | 1 | 1 | 1 |
| 1 | 1 | 1 | 1 | 0 | 0 | 0 | 0 | 0 | 0 | 0 | 0 | 1 | 1 | 1 | 1 |
| 1 | 1 | 1 | 1 | 1 | 0 | 0 | 0 | 0 | 0 | 0 | 1 | 1 | 1 | 1 | 1 |
| 1 | 1 | 1 | 1 | 1 | 1 | 0 | 0 | 0 | 0 | 1 | 1 | 1 | 1 | 1 | 1 |
| 1 | 1 | 1 | 1 | 1 | 1 | 1 | 0 | 0 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |

| 1 | 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|
| 1 | 1 | 1 | 1 | 0 | 0 | 0 | 0 | 0 | 1 | 1 | 1 | 1 | 1 | 1 | 1 |
| 1 | 1 | 1 | 0 | 0 | 0 | 0 | 0 | 0 | 1 | 1 | 1 | 1 | 1 | 1 | 1 |
| 1 | 1 | 0 | 0 | 0 | 0 | 0 | 0 | 0 | 0 | 1 | 1 | 1 | 1 | 1 | 1 |
| 1 | 1 | 0 | 0 | 0 | 0 | 0 | 0 | 0 | 0 | 1 | 1 | 1 | 1 | 1 | 1 |
| 1 | 0 | 0 | 0 | 0 | 0 | 0 | 0 | 0 | 0 | 1 | 1 | 1 | 1 | 1 | 1 |
| 1 | 0 | 0 | 0 | 1 | 1 | 1 | 1 | 0 | 0 | 0 | 0 | 0 | 1 | 1 | 1 |
| 1 | 0 | 0 | 0 | 1 | 1 | 1 | 1 | 1 | 0 | 0 | 0 | 0 | 0 | 0 | 1 |
| 1 | 0 | 0 | 0 | 0 | 0 | 0 | 1 | 1 | 0 | 0 | 0 | 0 | 0 | 0 | 1 |
| 1 | 0 | 0 | 0 | 0 | 0 | 0 | 0 | 1 | 1 | 0 | 0 | 0 | 0 | 0 | 1 |
| 1 | 0 | 0 | 0 | 0 | 0 | 0 | 0 | 1 | 1 | 0 | 0 | 0 | 0 | 0 | 1 |
| 1 | 0 | 0 | 0 | 0 | 0 | 0 | 0 | 1 | 1 | 0 | 0 | 0 | 0 | 0 | 1 |
| 1 | 0 | 0 | 0 | 0 | 0 | 0 | 0 | 0 | 0 | 0 | 0 | 0 | 0 | 1 | 1 |
| 1 | 0 | 0 | 0 | 0 | 0 | 0 | 0 | 0 | 0 | 0 | 0 | 0 | 1 | 1 | 1 |
| 1 | 0 | 0 | 0 | 0 | 0 | 0 | 0 | 0 | 0 | 0 | 1 | 1 | 1 | 1 | 1 |
| 1 | 1 | 1 | 1 | 1 | 1 | 1 | 1 | 1 | 1 | 1 | 1 | 1 | 1 | 1 | 1 |

| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 0 | 1 | 1 | 1 | 1 |
| 1 | 1 | 1 | 1 | 1 | 1 | 1 | 1 | 1 | 1 | 0 | 0 | 0 | 1 | 1 | 1 |
| 1 | 1 | 1 | 1 | 1 | 1 | 1 | 1 | 1 | 1 | 0 | 0 | 0 | 0 | 1 | 1 |
| 1 | 1 | 1 | 1 | 1 | 1 | 1 | 1 | 1 | 1 | 0 | 0 | 0 | 0 | 0 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |

| 1 | 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 0 | 1 |
| 1 | 0 | 0 | 0 | 0 | 0 | 0 | 0 | 0 | 0 | 0 | 0 | 0 | 0 | 0 | 1 |
| 1 | 0 | 0 | 0 | 0 | 0 | 0 | 0 | 0 | 0 | 0 | 0 | 0 | 0 | 0 | 1 |
| 1 | 0 | 0 | 0 | 0 | 0 | 0 | 0 | 0 | 0 | 0 | 0 | 0 | 0 | 0 | 1 |
| 1 | 0 | 0 | 0 | 0 | 0 | 0 | 0 | 0 | 0 | 0 | 0 | 0 | 0 | 0 | 1 |
| 1 | 0 | 0 | 0 | 0 | 0 | 0 | 0 | 0 | 0 | 0 | 0 | 0 | 0 | 0 | 1 |
| 1 | 0 | 0 | 0 | 0 | 0 | 0 | 0 | 0 | 0 | 0 | 0 | 0 | 0 | 0 | 1 |
| 1 | 0 | 0 | 0 | 0 | 0 | 0 | 0 | 0 | 0 | 0 | 0 | 0 | 0 | 0 | 1 |
| 1 | 0 | 0 | 0 | 0 | 0 | 0 | 0 | 0 | 0 | 0 | 0 | 0 | 0 | 0 | 1 |
| 1 | 0 | 0 | 0 | 0 | 0 | 0 | 0 | 0 | 0 | 0 | 0 | 0 | 0 | 0 | 1 |
| 1 | 0 | 0 | 0 | 0 | 0 | 0 | 0 | 0 | 0 | 0 | 0 | 0 | 0 | 0 | 1 |
| 1 | 0 | 0 | 0 | 0 | 0 | 0 | 0 | 0 | 0 | 0 | 0 | 0 | 0 | 0 | 1 |
| 1 | 0 | 0 | 0 | 0 | 0 | 0 | 0 | 0 | 0 | 0 | 0 | 0 | 0 | 0 | 1 |
| 1 | 0 | 0 | 0 | 0 | 0 | 0 | 0 | 0 | 0 | 0 | 0 | 0 | 0 | 0 | 1 |
| 1 | 1 | 1 | 1 | 1 | 1 | 1 | 1 | 1 | 1 | 1 | 1 | 1 | 1 | 1 | 1 |

| 1 | 1 | 1 | 1 | 1 | 1 | 1 | 1 | 1 | 1 | 1 | 1 | 1 | 1 |
|---|---|---|---|---|---|---|---|---|---|---|---|---|---|
| 1 | 1 | 1 | 1 | 1 | 1 | 1 | 1 | 1 | 1 | 1 | 1 | 1 | 1 |
| 1 | 1 | 0 | 0 | 0 | 0 | 0 | 0 | 0 | 0 | 0 | 0 | 1 | 1 |
| 1 | 1 | 0 | 0 | 0 | 0 | 0 | 0 | 0 | 0 | 0 | 0 | 1 | 1 |
| 1 | 1 | 0 | 0 | 0 | 0 | 0 | 0 | 0 | 0 | 0 | 0 | 1 | 1 |
| 1 | 1 | 0 | 0 | 0 | 0 | 0 | 0 | 0 | 0 | 0 | 0 | 1 | 1 |
| 1 | 1 | 0 | 0 | 0 | 0 | 0 | 0 | 0 | 0 | 0 | 0 | 1 | 1 |
| 1 | 1 | 0 | 0 | 0 | 0 | 0 | 0 | 0 | 0 | 0 | 0 | 1 | 1 |
| 1 | 1 | 0 | 0 | 0 | 0 | 0 | 0 | 0 | 0 | 0 | 0 | 1 | 1 |
| 1 | 1 | 0 | 0 | 0 | 0 | 0 | 0 | 0 | 0 | 0 | 0 | 1 | 1 |
| 1 | 1 | 0 | 0 | 0 | 0 | 0 | 0 | 0 | 0 | 0 | 0 | 1 | 1 |
| 1 | 1 | 0 | 0 | 0 | 0 | 0 | 0 | 0 | 0 | 0 | 0 | 1 | 1 |
| 1 | 1 | 0 | 0 | 0 | 0 | 0 | 0 | 0 | 0 | 0 | 0 | 1 | 1 |
| 1 | 1 | 0 | 0 | 0 | 0 | 0 | 0 | 0 | 0 | 0 | 0 | 1 | 1 |
| 1 | 1 | 0 | 0 | 0 | 0 | 0 | 0 | 0 | 0 | 0 | 0 | 1 | 1 |
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 |

FIG. 27

| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 0 | 0 | 0 | 0 | 0 | 0 | 1 | 1 | 1 | 1 | 1 |
| 1 | 1 | 1 | 0 | 0 | 0 | 0 | 0 | 0 | 0 | 0 | 0 | 0 | 1 | 1 | 1 |
| 1 | 1 | 1 | 0 | 0 | 0 | 0 | 0 | 0 | 0 | 0 | 0 | 0 | 1 | 1 | 1 |
| 1 | 1 | 0 | 0 | 0 | 0 | 0 | 0 | 0 | 0 | 0 | 0 | 0 | 0 | 1 | 1 |
| 1 | 1 | 0 | 0 | 0 | 0 | 0 | 0 | 0 | 0 | 0 | 0 | 0 | 0 | 1 | 1 |
| 1 | 1 | 0 | 0 | 0 | 0 | 0 | 0 | 0 | 0 | 0 | 0 | 0 | 0 | 1 | 1 |
| 1 | 1 | 0 | 0 | 0 | 0 | 0 | 0 | 0 | 0 | 0 | 0 | 0 | 0 | 1 | 1 |
| 1 | 1 | 0 | 0 | 0 | 0 | 0 | 0 | 0 | 0 | 0 | 0 | 0 | 0 | 1 | 1 |
| 1 | 1 | 0 | 0 | 0 | 0 | 0 | 0 | 0 | 0 | 0 | 0 | 0 | 0 | 1 | 1 |
| 1 | 1 | 1 | 0 | 0 | 0 | 0 | 0 | 0 | 0 | 0 | 0 | 0 | 1 | 1 | 1 |
| 1 | 1 | 1 | 0 | 0 | 0 | 0 | 0 | 0 | 0 | 0 | 0 | 0 | 1 | 1 | 1 |
| 1 | 1 | 1 | 1 | 1 | 0 | 0 | 0 | 0 | 0 | 0 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |

FIG. 28

| 0 | 0 | 0 | 0 | 0 | 0 | 0 | 1 | 1 | 0 | 0 | 0 | 0 | 0 | 0 | 0 |
| 0 | 0 | 0 | 0 | 0 | 0 | 0 | 1 | 1 | 0 | 0 | 0 | 0 | 0 | 0 | 0 |
| 0 | 0 | 0 | 0 | 0 | 0 | 0 | 1 | 1 | 0 | 0 | 0 | 0 | 0 | 0 | 0 |
| 0 | 0 | 0 | 0 | 0 | 0 | 0 | 1 | 1 | 0 | 0 | 0 | 0 | 0 | 0 | 0 |
| 0 | 0 | 0 | 0 | 0 | 0 | 0 | 1 | 1 | 0 | 0 | 0 | 0 | 0 | 0 | 0 |
| 0 | 0 | 0 | 0 | 0 | 1 | 1 | 1 | 1 | 1 | 1 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

| 0 | 0 | 0 | 0 | 0 | 0 | 0 | 1 | 1 | 0 | 0 | 0 | 0 | 0 | 0 | 0 |
|---|---|---|---|---|---|---|---|---|---|---|---|---|---|---|---|
| 0 | 0 | 0 | 0 | 0 | 0 | 0 | 1 | 1 | 0 | 0 | 0 | 0 | 0 | 0 | 0 |
| 0 | 0 | 0 | 0 | 0 | 0 | 0 | 1 | 1 | 0 | 0 | 0 | 0 | 0 | 0 | 0 |
| 0 | 0 | 0 | 0 | 0 | 0 | 0 | 1 | 1 | 0 | 0 | 0 | 0 | 0 | 0 | 0 |
| 0 | 0 | 0 | 0 | 0 | 0 | 0 | 1 | 1 | 0 | 0 | 0 | 0 | 0 | 0 | 0 |
| 0 | 0 | 0 | 0 | 0 | 1 | 1 | 1 | 1 | 1 | 1 | 0 | 0 | 0 | 0 | 0 |
| 0 | 0 | 0 | 0 | 1 | 1 | 1 | 1 | 1 | 1 | 1 | 1 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

FIG. 31

| 0 | 0 | 0 | 0 | 0 | 0 | 0 | 1 | 1 | 0 | 0 | 0 | 0 | 0 | 0 | 0 |
| 0 | 0 | 0 | 0 | 0 | 0 | 0 | 1 | 1 | 0 | 0 | 0 | 0 | 0 | 0 | 0 |
| 0 | 0 | 0 | 0 | 0 | 0 | 0 | 1 | 1 | 0 | 0 | 0 | 0 | 0 | 0 | 0 |
| 0 | 0 | 0 | 0 | 0 | 0 | 0 | 1 | 1 | 0 | 0 | 0 | 0 | 0 | 0 | 0 |
| 0 | 0 | 0 | 0 | 0 | 0 | 0 | 1 | 1 | 0 | 0 | 0 | 0 | 0 | 0 | 0 |
| 0 | 0 | 0 | 0 | 0 | 1 | 1 | 1 | 1 | 1 | 1 | 0 | 0 | 0 | 0 | 0 |
| 0 | 0 | 0 | 0 | 1 | 1 | 1 | 1 | 1 | 1 | 1 | 1 | 0 | 0 | 0 | 0 |
| 0 | 0 | 0 | 0 | 1 | 1 | 0 | 0 | 0 | 0 | 1 | 1 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

FIG. 32

| 0 | 0 | 0 | 0 | 0 | 0 | 0 | 1 | 1 | 0 | 0 | 0 | 0 | 0 | 0 | 0 |
|---|---|---|---|---|---|---|---|---|---|---|---|---|---|---|---|
| 0 | 0 | 0 | 0 | 0 | 0 | 0 | 1 | 1 | 0 | 0 | 0 | 0 | 0 | 0 | 0 |
| 0 | 0 | 0 | 0 | 0 | 0 | 0 | 1 | 1 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 1 | 1 | 1 | 1 | 1 | 1 | 0 | 0 | 0 | 0 | 0 |
| 0 | 0 | 0 | 0 | 1 | 1 | 1 | 1 | 1 | 1 | 1 | 1 | 0 | 0 | 0 | 0 |
| 0 | 0 | 0 | 0 | 1 | 1 | 0 | 0 | 0 | 0 | 1 | 1 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

FIG. 33

| 1 | 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|
| 1 | 0 | 0 | 0 | 0 | 0 | 0 | 1 | 1 | 0 | 0 | 0 | 0 | 0 | 0 | 1 |
| 1 | 0 | 0 | 0 | 0 | 0 | 0 | 1 | 1 | 0 | 0 | 0 | 0 | 0 | 0 | 1 |
| 1 | 0 | 0 | 0 | 0 | 0 | 0 | 0 | 0 | 0 | 0 | 0 | 0 | 0 | 0 | 1 |
| 1 | 0 | 0 | 0 | 0 | 0 | 0 | 0 | 0 | 0 | 0 | 0 | 0 | 0 | 0 | 1 |
| 1 | 0 | 0 | 0 | 0 | 1 | 1 | 1 | 1 | 1 | 1 | 0 | 0 | 0 | 0 | 1 |
| 1 | 0 | 0 | 0 | 1 | 1 | 1 | 1 | 1 | 1 | 1 | 1 | 0 | 0 | 0 | 1 |
| 1 | 0 | 0 | 0 | 1 | 1 | 0 | 0 | 0 | 0 | 1 | 1 | 0 | 0 | 0 | 1 |
| 1 | 0 | 0 | 0 | 0 | 0 | 0 | 0 | 0 | 0 | 0 | 0 | 0 | 0 | 0 | 1 |
| 1 | 0 | 0 | 0 | 0 | 0 | 0 | 0 | 0 | 0 | 0 | 0 | 0 | 0 | 0 | 1 |
| 1 | 0 | 0 | 0 | 0 | 0 | 0 | 0 | 0 | 0 | 0 | 0 | 0 | 0 | 0 | 1 |
| 1 | 0 | 0 | 0 | 0 | 0 | 0 | 0 | 0 | 0 | 0 | 0 | 0 | 0 | 0 | 1 |
| 1 | 0 | 0 | 0 | 0 | 0 | 0 | 0 | 0 | 0 | 0 | 0 | 0 | 0 | 0 | 1 |
| 1 | 0 | 0 | 0 | 0 | 0 | 0 | 0 | 0 | 0 | 0 | 0 | 0 | 0 | 0 | 1 |
| 1 | 0 | 0 | 0 | 0 | 0 | 0 | 0 | 0 | 0 | 0 | 0 | 0 | 0 | 0 | 1 |
| 1 | 1 | 1 | 1 | 1 | 1 | 1 | 1 | 1 | 1 | 1 | 1 | 1 | 1 | 1 | 1 |

FIG. 34

| 1 | 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|
| 1 | 1 | 0 | 0 | 0 | 0 | 1 | 1 | 1 | 1 | 0 | 0 | 0 | 0 | 1 | 1 |
| 1 | 0 | 0 | 0 | 0 | 0 | 0 | 1 | 1 | 0 | 0 | 0 | 0 | 0 | 0 | 1 |
| 1 | 0 | 0 | 0 | 0 | 0 | 0 | 0 | 0 | 0 | 0 | 0 | 0 | 0 | 0 | 1 |
| 1 | 0 | 0 | 0 | 0 | 0 | 0 | 0 | 0 | 0 | 0 | 0 | 0 | 0 | 0 | 0 |
| 1 | 0 | 0 | 0 | 0 | 1 | 1 | 1 | 1 | 1 | 1 | 0 | 0 | 0 | 0 | 1 |
| 1 | 0 | 0 | 0 | 1 | 1 | 1 | 1 | 1 | 1 | 1 | 1 | 0 | 0 | 0 | 1 |
| 1 | 0 | 0 | 0 | 1 | 1 | 0 | 0 | 0 | 0 | 1 | 1 | 0 | 0 | 0 | 1 |
| 1 | 1 | 0 | 0 | 0 | 0 | 0 | 0 | 0 | 0 | 0 | 0 | 0 | 0 | 1 | 1 |
| 1 | 1 | 0 | 0 | 0 | 0 | 0 | 0 | 0 | 0 | 0 | 0 | 0 | 0 | 1 | 1 |
| 1 | 1 | 0 | 0 | 0 | 0 | 0 | 0 | 0 | 0 | 0 | 0 | 0 | 0 | 1 | 1 |
| 1 | 1 | 0 | 0 | 0 | 0 | 0 | 0 | 0 | 0 | 0 | 0 | 0 | 0 | 1 | 1 |
| 1 | 1 | 0 | 0 | 0 | 0 | 0 | 0 | 0 | 0 | 0 | 0 | 0 | 0 | 1 | 1 |
| 1 | 1 | 0 | 0 | 0 | 0 | 0 | 0 | 0 | 0 | 0 | 0 | 0 | 0 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |

FIG. 35

| 1 | 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|
| 1 | 1 | 0 | 0 | 0 | 0 | 1 | 1 | 1 | 1 | 0 | 0 | 0 | 0 | 1 | 1 |
| 1 | 0 | 0 | 0 | 0 | 0 | 0 | 1 | 1 | 0 | 0 | 0 | 0 | 0 | 0 | 1 |
| 1 | 0 | 0 | 0 | 0 | 0 | 0 | 0 | 0 | 0 | 0 | 0 | 0 | 0 | 0 | 1 |
| 1 | 0 | 0 | 0 | 0 | 0 | 0 | 0 | 0 | 0 | 0 | 0 | 0 | 0 | 0 | 0 |
| 1 | 0 | 0 | 0 | 0 | 1 | 1 | 1 | 1 | 1 | 1 | 0 | 0 | 0 | 0 | 1 |
| 1 | 0 | 0 | 0 | 1 | 1 | 1 | 1 | 1 | 1 | 1 | 1 | 0 | 0 | 0 | 1 |
| 1 | 0 | 0 | 0 | 1 | 1 | 0 | 0 | 0 | 0 | 1 | 1 | 0 | 0 | 0 | 1 |
| 1 | 1 | 0 | 0 | 0 | 0 | 0 | 0 | 0 | 0 | 0 | 0 | 0 | 0 | 1 | 1 |
| 1 | 1 | 0 | 0 | 0 | 0 | 0 | 0 | 0 | 0 | 0 | 0 | 0 | 0 | 1 | 1 |
| 1 | 1 | 0 | 0 | 0 | 0 | 0 | 0 | 0 | 0 | 0 | 0 | 0 | 0 | 1 | 1 |
| 1 | 1 | 1 | 0 | 0 | 0 | 0 | 0 | 0 | 0 | 0 | 0 | 0 | 1 | 1 | 1 |
| 1 | 1 | 1 | 0 | 0 | 0 | 0 | 0 | 0 | 0 | 0 | 0 | 0 | 1 | 1 | 1 |
| 1 | 1 | 1 | 1 | 1 | 0 | 0 | 0 | 0 | 0 | 0 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |

FIG. 36

| 1 | 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|
| 1 | 1 | 0 | 0 | 0 | 0 | 1 | 1 | 1 | 1 | 0 | 0 | 0 | 0 | 1 | 1 |
| 1 | 0 | 0 | 0 | 0 | 0 | 0 | 1 | 1 | 0 | 0 | 0 | 0 | 0 | 0 | 1 |
| 1 | 0 | 0 | 0 | 0 | 0 | 0 | 0 | 0 | 0 | 0 | 0 | 0 | 0 | 0 | 1 |
| 1 | 0 | 0 | 0 | 0 | 0 | 0 | 0 | 0 | 0 | 0 | 0 | 0 | 0 | 0 | 0 |
| 1 | 0 | 0 | 0 | 0 | 1 | 1 | 1 | 1 | 1 | 1 | 0 | 0 | 0 | 0 | 1 |
| 1 | 0 | 0 | 0 | 1 | 1 | 1 | 1 | 1 | 1 | 1 | 1 | 0 | 0 | 0 | 1 |
| 1 | 0 | 0 | 0 | 1 | 1 | 0 | 0 | 0 | 0 | 1 | 1 | 0 | 0 | 0 | 1 |
| 1 | 1 | 0 | 0 | 0 | 0 | 0 | 0 | 0 | 0 | 0 | 0 | 0 | 0 | 1 | 1 |
| 1 | 1 | 0 | 0 | 0 | 0 | 0 | 0 | 0 | 0 | 0 | 0 | 0 | 0 | 1 | 1 |
| 1 | 1 | 0 | 0 | 0 | 0 | 0 | 0 | 0 | 0 | 0 | 0 | 0 | 0 | 1 | 1 |
| 1 | 1 | 1 | 1 | 0 | 0 | 0 | 0 | 0 | 0 | 0 | 0 | 1 | 1 | 1 | 1 |
| 1 | 1 | 1 | 1 | 1 | 0 | 0 | 0 | 0 | 0 | 0 | 1 | 1 | 1 | 1 | 1 |
| 1 | 1 | 1 | 1 | 1 | 0 | 0 | 0 | 0 | 0 | 0 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |

488

1024

| 1 | 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 0 | 0 | 0 | 0 | 1 | 1 | 1 | 1 | 1 | 1 |
| 1 | 1 | 1 | 1 | 1 | 0 | 0 | 0 | 0 | 0 | 0 | 1 | 1 | 1 | 1 | 1 |
| 1 | 1 | 1 | 1 | 0 | 0 | 1 | 0 | 0 | 1 | 0 | 0 | 1 | 1 | 1 | 1 |
| 1 | 1 | 1 | 1 | 0 | 0 | 0 | 0 | 0 | 0 | 0 | 0 | 1 | 1 | 1 | 1 |
| 1 | 1 | 1 | 1 | 0 | 0 | 1 | 0 | 0 | 1 | 0 | 0 | 1 | 1 | 1 | 1 |
| 1 | 1 | 1 | 1 | 0 | 0 | 0 | 1 | 1 | 0 | 0 | 0 | 1 | 1 | 1 | 1 |
| 1 | 1 | 1 | 1 | 1 | 0 | 0 | 0 | 0 | 0 | 0 | 1 | 1 | 1 | 1 | 1 |
| 1 | 1 | 1 | 1 | 1 | 1 | 0 | 0 | 0 | 0 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |

FIG. 41

APERTURE AND APERTURE CONTROL METHOD, IMAGING LENS, AND ELECTRONIC DEVICE

CROSS-REFERENCE TO RELATED APPLICATIONS

This application is a continuation of International Application No. PCT/CN2021/090338, filed on Apr. 27, 2021, which claims priority to Chinese Patent Application No. 202010518630.3, filed on Jun. 9, 2020. The disclosures of the aforementioned applications are hereby incorporated by reference in their entireties.

TECHNICAL FIELD

This application relates to the field of photographing technologies, and in particular, to an aperture and an aperture control method, an imaging lens, and an electronic device.

BACKGROUND

Since the camera was invented, an aperture has been an important component of the camera. With development of photographing technologies, photographing is no longer limited to a small quantity of professional groups, and ordinary consumers can also take photos. Consumers' understanding of photographing has been changed from requirement-based photographing, and skill-focused photographing, to creative photographing, and idea-based photographing nowadays. Research shows that an optimal pattern (a size, a shape, an offset, rotation, and the like) of the aperture varies greatly with application scenarios, photographing conditions, and photographing content that are of a user. Therefore, based on a real-time change in a photographing process, the user self-defines an aperture pattern, in other words, configures a programmable aperture for a photographing device, to gradually achieve autonomous photographing. Currently, only a size of a mainstream aperture may be adjusted. The programmable aperture technology is not mature, and stability and transmittance of the aperture are limited.

SUMMARY

Embodiments of this application provide an aperture and an aperture control method, an imaging lens, and an electronic device, to provide a new programmable aperture with higher stability and good transmittance.

According to a first aspect, an embodiment of this application provides an aperture. The aperture includes a first substrate and a second substrate that are disposed opposite to each other. An area between the first substrate and the second substrate includes a first area and a second area. For example, the first area may be an area close to an optical axis of the aperture, and the second area is an area surrounding the first area. A drive electrode array on the second substrate is located in the first area, a common electrode on the second substrate is located in the second area, and the common electrode is covered by a first fluid located in the second area. The drive electrode array includes transparent drive electrodes arranged in an array. The aperture further includes a second fluid, where the second fluid covers the first fluid and the drive electrode array, the first fluid is an opaque electrolyte, the second fluid is a transparent liquid, and the first fluid is insoluble with the second fluid.

In this way, when a voltage is applied to a drive electrode in the drive electrode array, an electric field is formed between the drive electrode and the common electrode. Because the first fluid is the electrolyte, the first fluid flows to the drive electrode to which the voltage is applied under action of the electric field. In addition, because the first fluid is the opaque electrolyte, an area corresponding to the transparent drive electrode can be shielded. The second fluid still covers an area corresponding to a drive electrode to which no voltage is applied. Therefore, the area corresponding to the drive electrode that is not shielded by the first fluid can transmit light, to form an aperture pattern. Therefore, when an aperture pattern that needs to be formed is determined, a transparent position and an opaque position of the drive electrode array may be determined based on a shape of the aperture pattern, and a voltage is applied to a corresponding drive electrode of the drive electrode array based on the opaque position. In this way, the first fluid shields the drive electrode to which the voltage is applied, an area corresponding to a drive electrode to which no voltage is applied is not shielded by the first fluid and can transmit light, and the required aperture pattern can be formed. Therefore, when required aperture patterns are different, transparent positions and opaque positions that are determined on the drive electrode array are also different. Therefore, for different aperture patterns, drive electrodes to which a voltage needs to be applied in the drive electrode array are also different. In this way, the aperture is controlled; and because no mechanical component is required, stability of the aperture is higher. In addition, transmittance of the aperture depends only on transmittance and reflection of materials at each functional layer and transmittance of the second fluid, so that good transmittance can be ensured.

In a possible implementation, to ensure that the first fluid and the second fluid can flow smoothly between the first substrate and the second substrate, the aperture further includes a first hydrophobic layer and a second hydrophobic layer. The first hydrophobic layer is disposed between the first substrate and the second fluid, and the second hydrophobic layer is disposed between the second fluid and the drive electrode array. The second hydrophobic layer is configured to seal the drive electrode array between the second hydrophobic layer and the second substrate. In addition, the first hydrophobic layer and the second hydrophobic layer are hydrophobic to the first fluid and the second fluid, to ensure that the first fluid and the second fluid can flow smoothly between the first substrate and the second substrate.

In a possible implementation, because the first fluid is the electrolyte and is electrically conductive, to prevent the first fluid from affecting the drive electrode array, the aperture further includes an insulation dielectric layer. The insulation dielectric layer is disposed between the second hydrophobic layer and the drive electrode array.

In a possible implementation, the aperture further includes a sidewall frame, and the sidewall frame is disposed between the first hydrophobic layer and the second substrate. The sidewall frame seals the first fluid and the second fluid in space between the first hydrophobic layer and the second substrate. The sidewall frame mainly functions as a support, and also seals the first fluid and the second fluid.

In a possible implementation, the drive electrode includes an electrode block and a switch transistor, the drive electrode array further includes gate leads and drain leads that are arranged in a cross manner, the electrode block is connected to a source of the switch transistor, a gate of the switch transistor is connected to one gate lead, and a drain of the switch transistor is connected to one drain lead.

In a possible implementation, an outer-facing edge of each electrode block of a drive electrode at an edge of the drive electrode array has a structure in which recesses and protrusions are arranged in an overlapping manner. Similarly, the insulation dielectric layer that is in contact with the electrode block of the drive electrode array inward also has a structure in which recesses and protrusions are arranged in an overlapping manner. Similarly, the second hydrophobic layer that is in contact with the insulation dielectric layer inward also has a structure in which recesses and protrusions are arranged in an overlapping manner. In this structure similar to a "hand shape" in which recesses and protrusions are arranged in an overlapping manner, the drive electrode and the first fluid intersect to some extent. This helps the first fluid quickly flow to the corresponding electrode block under action of an electric field. When the electric field is lost, the first fluid can flow back to an original position smoothly. This can improve reliability and repeatability of aperture control. The structure in which the recesses and the protrusions are arranged in the overlapping manner in the figure is described by using arc-shaped concaves or protrusions as an example. The recesses or the protrusions may also be of a sawtooth shape, a square shape, or the like.

In a possible implementation, a gap between the electrode blocks is filled with an insulation coating, and a difference between a refractive index of the insulation coating and a refractive index of the electrode block is less than a preset value. In this way, a diffraction halo phenomenon caused by the tiny periodic gap to final imaging of the imaging lens can be avoided. When the refractive index of the insulation coating is equal to the refractive index of the electrode block, the diffraction halo phenomenon caused by the periodic gap to the final imaging of the imaging lens can be completely avoided.

In a possible implementation, the aperture further includes a microstructure column. The microstructure column is disposed on the second substrate, and located between the common electrode and the second hydrophobic layer. The microstructure column is hydrophilic to the second fluid. Because the microstructure column having hydrophilicity to the second fluid is disposed, when no electric field voltage is applied to the electrode block, the microstructure column may adsorb the second fluid to form a barrier to prevent the first fluid from entering the first area. In this way, reliability and repeatability of aperture control are ensured. To further improve the foregoing effect, the microstructure column further has a hydrophobic characteristic for the first fluid. The hydrophilicity and hydrophobicity mean wettability of the second fluid or the first fluid to the microstructure column. Hydrophilicity means that wettability of the second fluid to the microstructure column is wet, and hydrophobicity means that wettability of the first fluid to the microstructure column is not wet.

In a possible implementation, the aperture further includes a light shield layer. The light shield layer is located in the second area; and the light shield layer is disposed on a side that is of the first substrate and that is away from the second substrate, or the light shield layer is disposed on a side that is of the second substrate and that is away from the first substrate. This can avoid that the first fluid in the second area at an edge of the aperture cannot completely shield ambient stray light.

In a possible implementation, the second fluid is oil liquid.

In a possible implementation, the drive electrode array includes drive electrodes arranged in an M×N array, where M is a quantity of rows of the drive electrodes, N is a quantity of columns of the drive electrodes, and M and N are positive integers.

According to a second aspect, an aperture control method provided in the first aspect is provided. The aperture control method includes: applying an electric field voltage to some drive electrodes in a drive electrode array, moving a first fluid to an area corresponding to the some drive electrodes to cover the area corresponding to the some drive electrodes, and forming an aperture pattern in an area corresponding to other drive electrodes other than the some drive electrodes in the drive electrode array.

In a possible implementation, no isolation area exists in the aperture pattern, the isolation area is an opaque area surrounded by the aperture pattern, and the some drive electrodes include drive electrodes on a periphery of the area corresponding to the aperture pattern in the drive electrode array. The applying an electric field voltage to some drive electrodes in the drive electrode array includes: sequentially applying the electric field voltage to the some drive electrodes from a periphery of the drive electrode array to a center of the drive electrode array.

In a possible implementation, an isolation area exists in the aperture pattern, and the isolation area is an opaque area surrounded by the aperture pattern. The some drive electrodes include drive electrodes on a periphery of the area corresponding to the aperture pattern in the drive electrode array, and drive electrodes corresponding to the isolation area. The applying an electric field voltage to some drive electrodes in the drive electrode array includes: determining one channel in the drive electrode array based on the isolation area, where the channel is connected to the isolation area and the first fluid: sequentially applying the electric field voltage to drive electrodes on the channel from a periphery of the drive electrode array to a center of the drive electrode array: sequentially applying the electric field voltage to the drive electrodes corresponding to the isolation area from approaching the channel to away from the channel; canceling the electric field voltage of the drive electrodes on the channel; and sequentially applying the electric field voltage to the drive electrodes on the periphery of the area corresponding to the aperture pattern in the drive electrode array from the periphery of the drive electrode array to the center of the drive electrode array.

In a possible implementation, the channel is determined based on a distance between the first fluid and the isolation area, or the channel is determined based on a distance between an edge that is of the aperture pattern and that is away from the isolation area and the isolation area.

According to a third aspect, an imaging lens is provided, including at least one lens according to the aperture provided in the first aspect.

In a possible implementation, protective glass, a lens group, and a sensor are sequentially included on an optical axis of the imaging lens based on an incident direction of light on the optical axis, and the aperture is disposed at one end of the lens group or between any two adjacent lenses in the lens group.

In a possible implementation, any lens in the lens group is used as a first substrate or a second substrate of the aperture.

In a possible implementation, the imaging lens sequentially includes the aperture, a lens group, and a sensor in a direction of an optical axis.

According to a fourth aspect, an aperture control apparatus is provided, configured to implement the foregoing methods. The aperture control apparatus includes a corresponding module, unit, or means for implementing the foregoing method. The module, unit, or means may be implemented through hardware, software, or hardware executing corresponding software. The hardware or the software includes one or more modules or units corresponding to the foregoing function.

According to a fifth aspect, an electronic device is provided, including the aperture according to the first aspect or the imaging lens according to the fourth aspect, a processor, and a memory. The memory is configured to store necessary program instructions and necessary data. The processor is configured to invoke the program instructions stored in the memory to perform the method according to any one of the foregoing aspects.

According to a sixth aspect, a computer-readable storage medium is provided. The computer-readable storage medium stores program instructions. When the program instructions are run on a computer or a processor, the computer or the processor is enabled to perform the method in any one of the foregoing aspects.

According to a seventh aspect, a computer program product including instructions is provided. When the instructions are run on a computer or a processor, the computer or the processor is enabled to perform the method in any one of the foregoing aspects.

For technical effects brought by any one of the second aspect to the seventh aspect and the design manners, refer to technical effects brought by different design manners in the first aspect. Details are not described herein again.

BRIEF DESCRIPTION OF DRAWINGS

FIG. 27 is a schematic diagram 2 of voltage distribution of electrode blocks in a drive electrode array in an aperture control method according to an embodiment of this application:

FIG. 28 is a schematic diagram 3 of voltage distribution of electrode blocks in a drive electrode array in an aperture control method according to an embodiment of this application:

FIG. 30 is a schematic diagram 2 of voltage distribution of electrode blocks in a drive electrode array in an aperture control method according to another embodiment of this application:

FIG. 31 is a schematic diagram 3 of voltage distribution of electrode blocks in a drive electrode array in an aperture control method according to an embodiment of this application:

FIG. 32 is a schematic diagram 4 of voltage distribution of electrode blocks in a drive electrode array in an aperture control method according to another embodiment of this application:

FIG. 33 is a schematic diagram 5 of voltage distribution of electrode blocks in a drive electrode array in an aperture control method according to another embodiment of this application:

FIG. 34 is a schematic diagram 6 of voltage distribution of electrode blocks in a drive electrode array in an aperture control method according to an embodiment of this application;

FIG. 35 is a schematic diagram 7 of voltage distribution of electrode blocks in a drive electrode array in an aperture control method according to another embodiment of this application;

FIG. 36 is a schematic diagram 8 of voltage distribution of electrode blocks in a drive electrode array in an aperture control method according to another embodiment of this application:

FIG. 41 is a schematic flowchart 4 of generating an aperture pattern according to an embodiment of this application:

DESCRIPTION OF EMBODIMENTS

The following describes technical solutions in embodiments of this application with reference to accompanying drawings in embodiments of this application. It is clear that the described embodiments are merely some but not all of embodiments of this application.

The terms "first" and "second" mentioned below are merely intended for a purpose of description, and shall not be understood as an indication or implication of relative importance or implicit indication of the number of indicated technical features. Therefore, a feature limited by "first", "second", or the like may explicitly or implicitly include one or more features. In addition, in this application, position terms such as "top" and "bottom" are defined relative to positions of components in the accompanying drawings. It should be understood that these position terms are relative concepts used for relative description and clarification, and may correspondingly change based on changes in the positions of the components in the accompanying drawings.

In this application, unless otherwise clearly specified and limited, the term "connection" should be understood in a broad sense. For example, the "connection" may be a fixed connection, a detachable connection, or an integral connection: may be a direct connection: or may be an indirect connection through an intermediate medium.

The following briefly describes concepts in embodiments of this application.

An aperture is an apparatus that controls an amount of light passing through an imaging lens and entering a photosensitive surface in a device body. The aperture is usually inside the imaging lens, or may be disposed outside the imaging lens and used with the imaging lens. An aperture size is represented by F.

The imaging lens is a component that uses a refraction principle of a lens to enable light of a scene to pass through the imaging lens and form a clear image on a focusing plane.

A switch transistor, also referred to as a switch triode, is usually a thin film transistor (TFT) in embodiments of this application.

Embodiments of this application are applied to an electronic device that has image capture functions such as photographing and video-recording. The electronic device is usually provided with an imaging lens having an aperture, or an aperture that is used with an imaging lens and that is independently disposed. The electronic device may be a camera, a video camera, a mobile phone, a pad, a personal computer, an intelligent wearable product (for example, a smartwatch or a smart band), a virtual reality (VR) terminal device, an augmented reality (AR) terminal device, or the like. A specific form of the electronic device is not specially limited in embodiments of this application. For ease of description, the following uses an example in which the electronic device is a mobile phone for description.

Figure 1A:
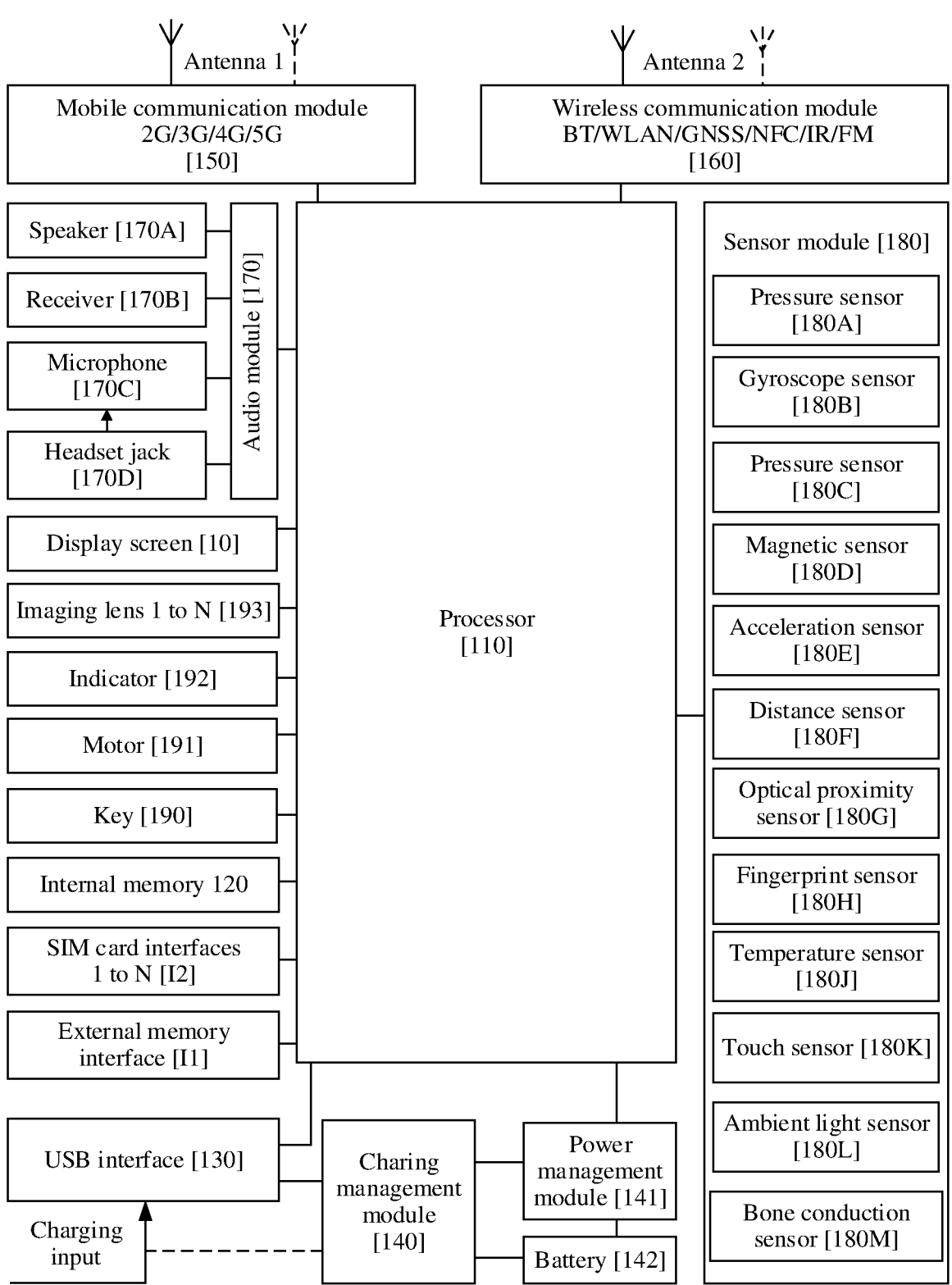
FIG. 1a is a schematic diagram of a structure of an electronic device according to an embodiment of this application.

Refer to FIG. 1a. The example in which the electronic device is a mobile phone is used. FIG. 1a shows a hardware structure of the mobile phone. As shown in FIG. 1a, the mobile phone may include a processor 110, an external memory interface I1, an internal memory 120, a universal serial bus (USB) interface 130, a charging management module 140, a power management module 141, a battery 142, an antenna 1, an antenna 2, a mobile communication module 160, a wireless communication module 150, an audio module 170, a speaker 170A, a receiver 170B, a microphone 170C, a headset jack 170D, a sensor module 180, a key 190, a motor 191, an indicator 192, an imaging lens 193, a display screen 10, a subscriber identity module (SIM) card interface 12, and the like.

The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that a structure shown in this embodiment of this application does not constitute a specific limitation on the mobile phone. In some other embodiments of this application, the mobile phone may include more or fewer components than those shown in the figure: or some components may be combined, or some components may be split, or there may be a different component layout. The components shown in the figure may be implemented through hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors.

The controller may be a nerve center and a command center of the mobile phone. The controller may generate an operation control signal based on an instruction operation code and a time sequence signal, to complete control of instruction reading and instruction execution.

The memory may be disposed in the processor 110, and is configured to store instructions and data. In some embodiments, the memory in the processor 110 is a cache. The memory may store an instruction or data that has been used or cyclically used by the processor 110. If the processor 110 needs to use the instructions or the data again, the processor may directly invoke the instructions or the data from the memory. This avoids repeated access and reduces waiting time of the processor 110, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronous serial bus, including a serial data line (SDL) and a serial clock line (SCL). The I2S interface may be configured to perform audio communication. The PCM interface may also be used to perform audio communication, and sample, quantize, and code an analog signal. The UART interface is a universal serial data bus, and is configured to perform asynchronous communication. The bus may be a bidirectional communication bus. The bus converts to-be-transmitted data between serial communication and parallel communication. The MIPI interface may be configured to connect the processor 110 to a peripheral component such as the display screen 10 or the imaging lens 193. The MIPI interface includes a camera serial interface (CSI), a display serial interface (DSI), and the like. The GPIO interface may be configured through software. The GPIO interface may be configured as a control signal or a data signal. The USB interface 130 is an interface that conforms to a USB standard specification, and may be specifically a mini USB interface, a micro USB interface, a USB type-C interface, or the like. The USB interface 130 may be configured to connect to a charger to charge the mobile phone, or may be configured to transmit data between the mobile phone and a peripheral device. The USB interface 130 may also be configured to connect to a headset and play audio through the headset. The interface may be further configured to connect to another electronic device, for example, an AR device.

It may be understood that an interface connection relationship between the modules shown in this embodiment of this application is merely used as an example for description, and does not constitute a limitation on the structure of the mobile phone. In some other embodiments of this application, the mobile phone may alternatively use an interface connection manner different from that in the foregoing embodiment, or a combination of a plurality of interface connection manners.

The charging management module 140 is configured to receive charging input from the charger. The charger may be a wireless charger or a wired charger. The power management module 141 is configured to connect the battery 142, the charging management module 140, and the processor 110. The power management module 141 receives input of the battery 142 and/or the charging management module 140, to supply power to the processor 110, the internal memory 120, an external memory, the display screen 10, the imaging lens 193, the wireless communication module 160, and the like. The power management module 141 may further be configured to monitor parameters such as a battery capacity, a battery cycle count, and a battery health status (electric leakage or impedance).

A wireless communication function of the mobile phone may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the mobile phone may be configured to cover one or more communication frequency bands. Different antennas may be further reused, to improve antenna utilization. For example, the antenna 1 may be reused as a diversity antenna of a wireless local area network. In some other embodiments, the antenna may be used in combination with a tuning switch.

The mobile communication module 150 may provide a wireless communication solution that includes 2G/3G/4G/5G or the like and that is applied to the mobile phone. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit an electromagnetic wave obtained through processing to the modem processor for demodulation. The mobile communication module 150 may further amplify a signal modulated by the modem processor, and convert the signal into an electromagnetic wave for radiation through the antenna 1. In some embodiments, at least some function modules of the mobile communication module 150 may be disposed in the processor 110. In some embodiments, the at least some function modules of the mobile communication module 150 and at least some modules of the processor 110 may be disposed in a same component. The modem processor may include a modulator and a demodulator.

The wireless communication module 160 may provide a wireless communication solution that is applied to the mobile phone and that includes a wireless local area network (WLAN) (for example, a wireless fidelity (Wi-Fi) network), Bluetooth (BT), a GNSS, frequency modulation (FM), a near field communication (NFC) technology, and an infrared (IR) technology. The wireless communication module 160 may be one or more components integrating at least one communication processing module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

For example, the GNSS in this embodiment of this application may include a GPS, a GLONASS, a BDS, a QZSS, an SBAS, and/or a GALILEO.

The mobile phone implements a display function by using the GPU, the display screen 10, the application processor, and the like. The GPU is a microprocessor used for image processing, and is connected to the display screen 10 and the application processor. The GPU is configured to perform mathematical and geometric computation, and render an image. The processor 110 may include one or more GPUs, which execute program instructions to generate or change display information. The display screen 10 is configured to display an image, a video, and the like. The display screen 10 includes a display panel.

The mobile phone may implement a photographing function by using the ISP, the imaging lens 193, the video codec, the GPU, the display screen 10, the application processor, and the like. The ISP is configured to process data fed back by the imaging lens 193. The imaging lens 193 is configured to capture a static image or a video. An optical image of an object is generated through the imaging lens and projected to a photosensitive element. The digital signal processor is configured to process a digital signal, and may process another digital signal in addition to a digital image signal. The video codec is configured to compress or decompress a digital video.

The NPU is a neural-network (NN) computing processor. The NPU quickly processes input information with reference to a structure of a biological neural network, for example, with reference to a transfer mode between human brain neurons; and may further continuously perform self-learning. Applications such as intelligent cognition of the mobile phone, such as image recognition, facial recognition, speech recognition, and text understanding, can be implemented by using the NPU.

The external memory interface I1 may be configured to connect to an external storage card, for example, a micro SD card, to extend a storage capability of the mobile phone. The external storage card communicates with the processor 110 through the external memory interface I1, to implement a data storage function. For example, files such as music and videos are stored in the external storage card.

The internal memory 120 may be configured to store computer-executable program code, where the executable-program code includes instructions. The processor 110 runs the instructions stored in the internal memory 120, to perform various function applications of the mobile phone and data processing.

The mobile phone may implement an audio function by using the audio module 170, the speaker 170A, the receiver 170B, the microphone 170C, the headset jack 170D, the application processor, and the like. For example, the audio function includes music playing, recording, and the like.

The audio module 170 is configured to convert digital audio information into an analog audio signal for output, and is also configured to convert analog audio input into a digital audio signal. The speaker 170A, also referred to as a "loudspeaker", is configured to convert an audio electrical signal into a sound signal. The receiver 170B, also referred to as an "earpiece", is configured to convert an audio electrical signal into a sound signal. The microphone 170C, also referred to as a "mike" or a "mic", is configured to convert a sound signal into an electrical signal. The headset jack 170D is configured to connect to a wired headset. The headset jack 170D may be the USB interface 130, may be a 3.2 mm open mobile terminal platform (OMTP) standard interface, or a cellular telecommunication industry association of the USA (CTIA) standard interface.

The key 190 includes a power-on key, a volume key, and the like. The key 190 may be a mechanical key, or may be a touch key. The mobile phone may receive key input, and generate key signal input related to user setting and function control of the mobile phone. The motor 191 may generate a vibration prompt. The motor 191 may be configured to provide an incoming call vibration prompt and a touch vibration feedback. The indicator 192 may be an indicator light, and may be configured to indicate a charging status and a power change, or may be configured to indicate a message, a missed call, a notification, and the like. The SIM card interface 12 is configured to connect to a SIM card. The SIM card may be inserted into the SIM card interface 12 or removed from the SIM card interface 12, to contact and separate from the mobile phone. The mobile phone may support one or N SIM card interfaces, where N is a positive integer greater than 1. The SIM card interface 12 can support a nano-SIM card, a micro-SIM card, a SIM card, and the like.

A software system of the mobile phone may use a layered architecture, an event-driven architecture, a microkernel architecture, a microservice architecture, or a cloud architecture. In this embodiment of this application, an Android system of a layered architecture is used as an example to describe a software structure of the mobile phone.

Figure 1B:
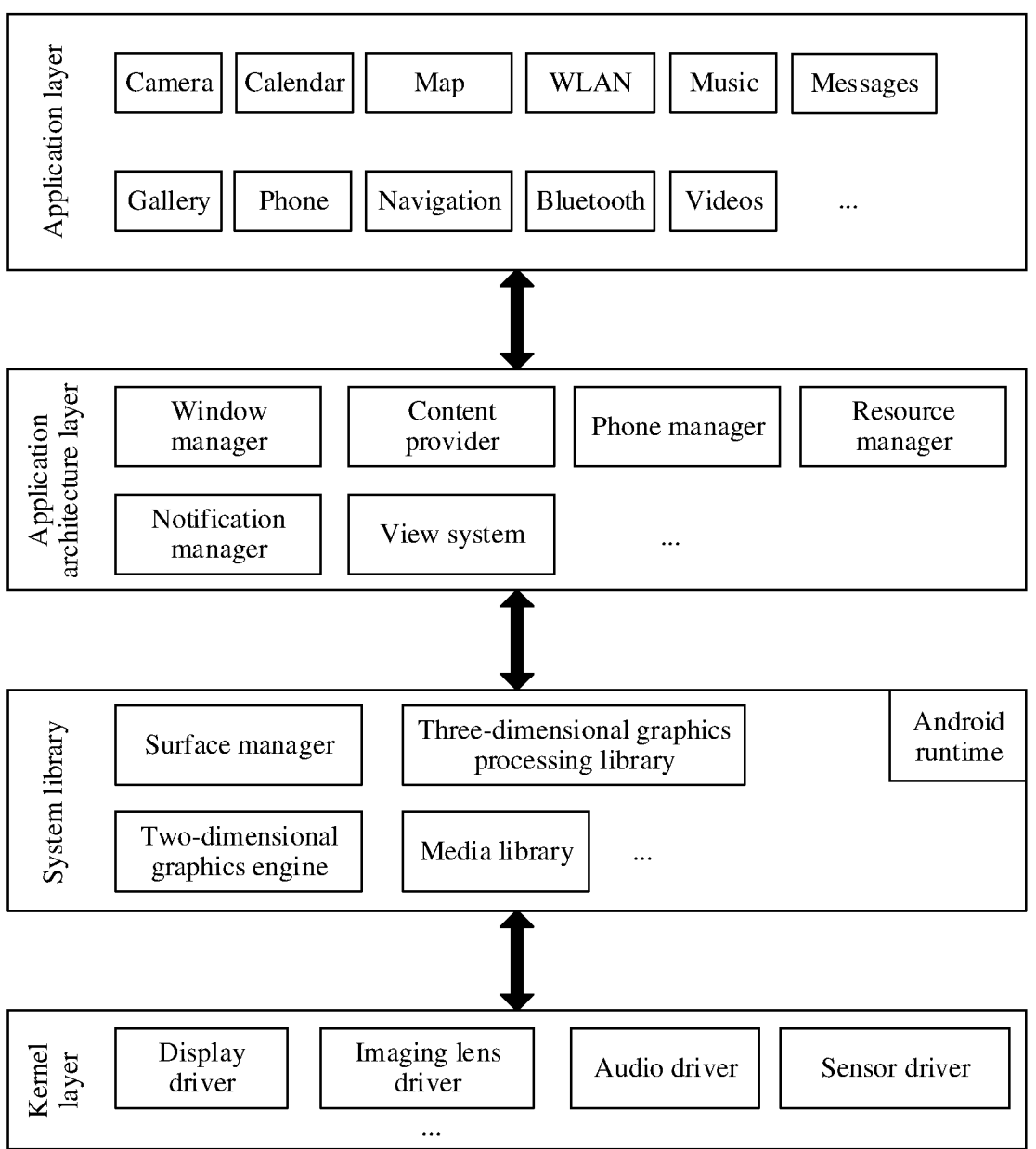
FIG. 1b is a block diagram of a software structure of an electronic device according to an embodiment of this application.

FIG. 1*b* is a block diagram of a software structure of a mobile phone according to an embodiment of this application.

In a layered architecture, software may be divided into several layers, each of which is assigned a clear role and task. The layers communicate with each other through a software interface. In some embodiments, the Android system is divided into four layers: an application layer, an application framework layer, an Android runtime and system library, and a kernel layer from top to bottom.

The application layer may include a series of application packages.

As shown in FIG. 1*b*, the application packages may include applications such as Camera, Gallery, Calendar, Phone, Map, Navigation, WLAN, Bluetooth, Music, Videos, and Messages.

The application framework layer provides an application programming interface (API) and a programming framework for the applications at the application layer.

The application framework layer includes some pre-defined functions.

As shown in FIG. 1b, the application framework layer may include a window manager, a content provider, a view system, a phone manager, a resource manager, a notification manager, and the like.

The window manager is configured to manage a window program. The window manager may obtain a size of a display screen, determine whether there is a status bar, perform screen locking, take a screenshot, and the like.

The content provider is configured to store and obtain data, and enable the data to be accessed by an application program. The data may include a video, an image, an audio, calls that are made and answered, a browsing history and bookmarks, an address book, and the like.

The view system includes visual controls such as a control for displaying a text and a control for displaying an image. The view system may be configured to construct an application program. A display interface may include one or more views. For example, a display interface including an SMS message notification icon may include a text display view and an image display view.

The phone manager is configured to provide a communication function of the mobile phone, for example, management of a call status (including answering, declining, or the like).

The resource manager provides various resources such as a localized character string, an icon, an image, a layout file, and a video file for an application program.

The notification manager enables an application program to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of a system in a form of a graph or a scroll bar text, for example, a notification of an application that is run on a background, or may be a notification that appears on a screen in a form of a dialog window. For example, text information is displayed in the status bar, an announcement is given, the electronic device vibrates, or the indicator light blinks.

The Android runtime includes a kernel library and a virtual machine. The Android runtime schedules and manages the Android system.

The kernel library includes two parts: a function that needs to be invoked in java language and a kernel library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of function modules, for example, a surface manager, a media library, a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video coding formats, such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, an imaging lens driver, an audio driver, and a sensor driver.

The following describes an example of a working process of software and hardware of the mobile phone with reference to a capture photographing scenario.

When the touch sensor 180K receives a touch operation, corresponding hardware interrupt is sent to the kernel layer. The kernel layer processes the touch operation into an original input event (including information such as touch coordinates and a time stamp of the touch operation). An original input event is stored at the kernel layer. The application framework layer obtains the original input event from the kernel layer, and identifies a control corresponding to the input event. An example in which the touch operation is a touch tap operation, and a control corresponding to the touch tap operation is a control of a camera application icon is used. A camera application invokes an interface of the application framework layer to enable the camera application, then enables the imaging lens driver by invoking the kernel layer, and captures a static image or a video through the imaging lens 193.

Figure 1C:
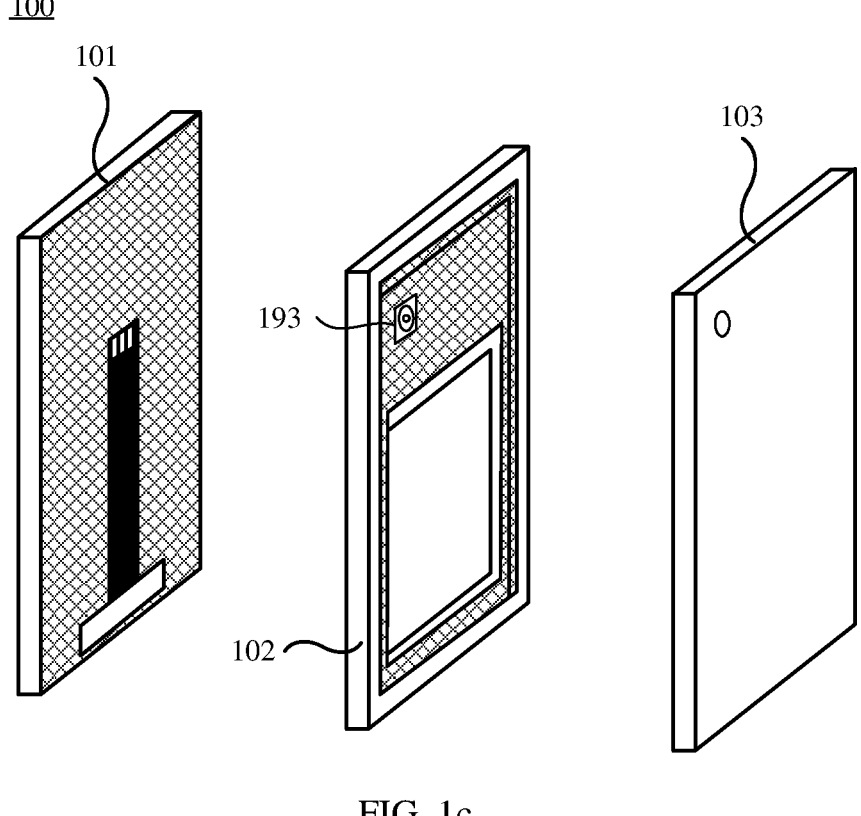
FIG. 1c is a schematic diagram of a structure of an electronic device according to another embodiment of this application.

The following describes disposition positions of the display screen 10 and the imaging lens 193 in the mobile phone. As shown in FIG. 1c, an electronic device 100 is provided. The mobile phone is used as an example, and mainly includes a display panel (DP) 101. The display panel 101 may be a liquid crystal display (LCD) screen or an organic light emitting diode (OLED) display screen. This is not limited in this application. The electronic device 100 further includes a middle frame 102 and a housing 103. The display panel 101 and the housing 103 are separately located on two sides of the middle frame 102, a back surface of the display panel 101 faces the housing 103, and the display panel 101 is connected to the housing 103 by using the middle frame 102. Components such as the processor, the external memory interface, the internal memory, the USB interface, the charging management module, the power management module, the battery, the antenna 1, the antenna 2, the mobile communication module, the wireless communication module, the audio module, the speaker, the receiver, the microphone, the headset jack, the sensor module, the key, the motor, the indicator, the imaging lens, the display screen, and the SIM card interface may be disposed on the middle frame 102. This is merely an example herein. The electronic device 100 may further include more or fewer components than those described above. As shown in FIG. 1c, when the imaging lens 193 is disposed on the middle frame 102 of the electronic device 100, the imaging lens 193 usually includes an aperture, or the aperture is independently disposed and used with the imaging lens 193. FIG. 1c shows only the imaging lens 193 disposed on the back surface of the middle frame 102 and facing the housing 103. Generally, in some examples, a front-facing imaging lens facing the display panel 101 may be further included.

Figure 2:
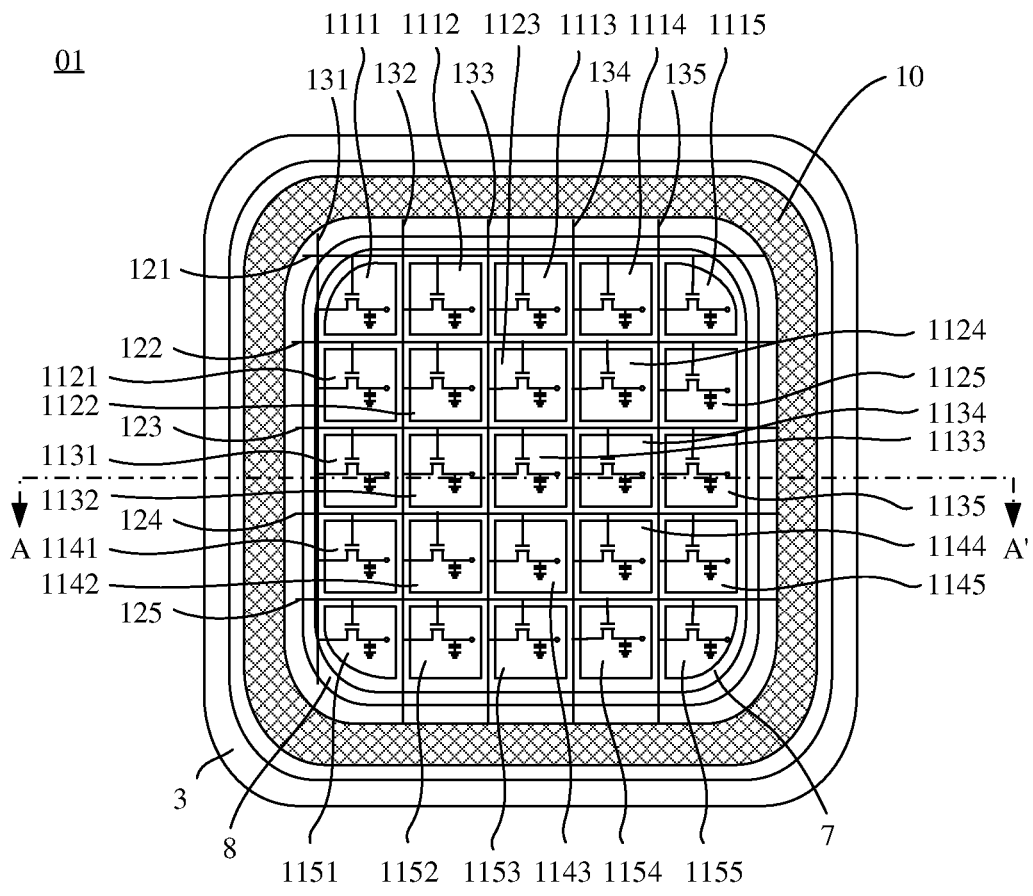
FIG. 2 is a schematic diagram of a top-viewed structure of an aperture according to an embodiment of this application.
Figure 3:
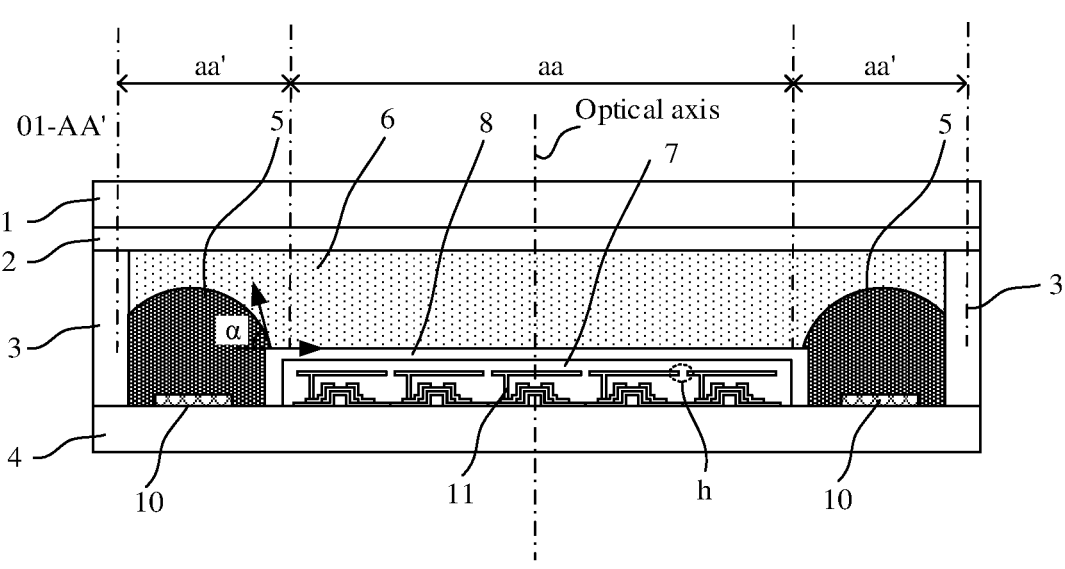
FIG. 3 is a schematic diagram of a structure of a cross-section at AA' in the aperture shown in FIG. 2 according to an embodiment of this application.

An embodiment of this application provides an aperture 01, which is used in the foregoing electronic device. As shown in FIG. 2 and FIG. 3, FIG. 2 provides a schematic diagram of a top-viewed structure of the aperture, and FIG.

3 provides a schematic diagram of a structure of a cross section at AA' of the aperture. The aperture 01 includes a first substrate 1 and a second substrate 4, where the first substrate 1 and the second substrate 4 may be disposed opposite to each other. A first area aa and a second area aa' are between the first substrate 1 and the second substrate 4. As shown in FIG. 2 and FIG. 3, the first area aa may be an area close to an optical axis of the aperture, and the second area aa' is an area surrounding the first area. A drive electrode array 11 on the second substrate 4 is located in the first area aa, a common electrode 10 on the second substrate 4 is located in the second area aa', and the common electrode 10 is covered by a first fluid 5 located in the second area aa'. The drive electrode array 11 includes transparent drive electrodes arranged in an array, the aperture further includes a second fluid 6, the second fluid 6 covers the first fluid 5 and the drive electrode array 11, the first fluid 5 is an opaque electrolyte, the second fluid 6 is a transparent liquid, and the first fluid 5 is insoluble with the second fluid 5.

It should be noted that transparency means that if a material of a structure does not completely absorb or does not completely reflect light of a band (usually absorbed by an atomic extra-nuclear electron of the material), the material is transparent to the light of the band; and if a material can absorb and reflect the light of the band, the material is not transparent to the light of the band. Because an energy band structure and transition of an electron are considered for a quantum mechanical effect, different materials can absorb or reflect only light of some bands. For example, if light of a band is absorbed or reflected by a material, and the band is not within a visible light band range, the material is transparent to a visible light band. Based on the foregoing principle, for a person, transparency and opaqueness of a material are mainly considered in the visible light band range (for example, a wavelength ranges from 380 nm to 780 nm) that can be recognized by human eyes. In the solution provided in this embodiment of this application, because the drive electrode, the first fluid, or the second fluid is usually a composite material (usually composed of a plurality of elements), there may be a plurality of elements for forming a structure such as the drive electrode, the first fluid, or the second fluid. However, different elements in the structure are transparent or opaque to light. Therefore, the transparent drive electrode in this application means that transmittance of the drive electrode to light in a visible light band is 70% to 99%. In other words, when the light in the visible light band passes through the drive electrode, only 1% to 30% of the light is absorbed or reflected. Similarly, in this application, that the second fluid 6 is the transparent liquid means that transmittance of the second fluid to light in the visible light band is 80% to 99%. In other words, when the light in the visible light band passes through the second fluid, only 1% to 20% of the light is absorbed or reflected. That the first fluid 5 is the opaque electrolyte means that transmittance of the first fluid to light in the visible light band is less than 1% (for example, the transmittance of the first fluid to the light in the visible light band may be 0.1% to 1%). In other words, when the light of the visible light band passes through the first fluid, more than 99% of the light can be absorbed or reflected by the first fluid.

Figure 4:
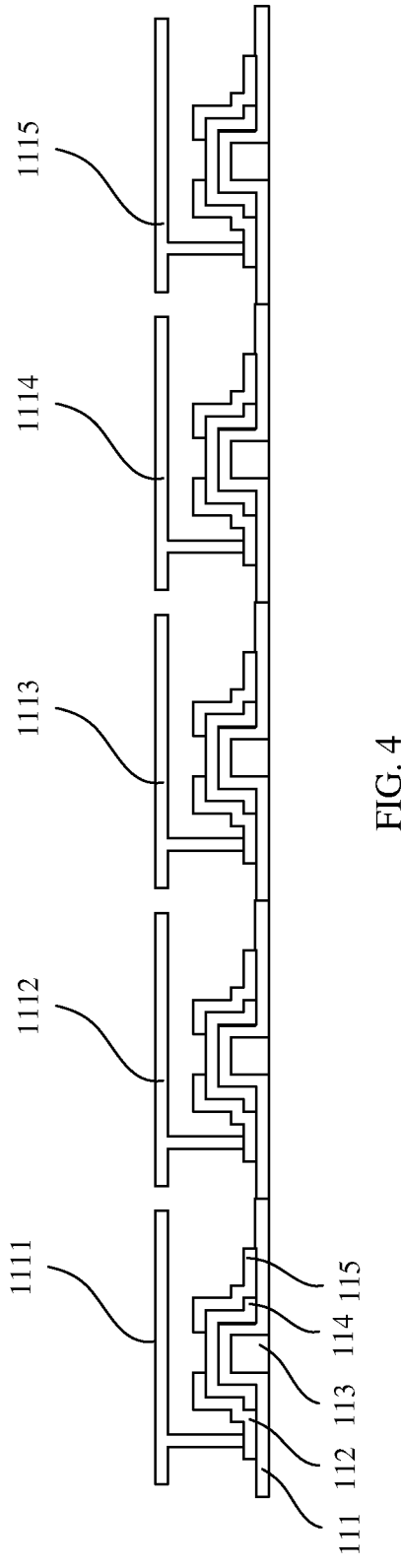
FIG. 4 is a schematic diagram of a structure of a cross-section of a drive electrode array according to an embodiment of this application.
Figure 5:
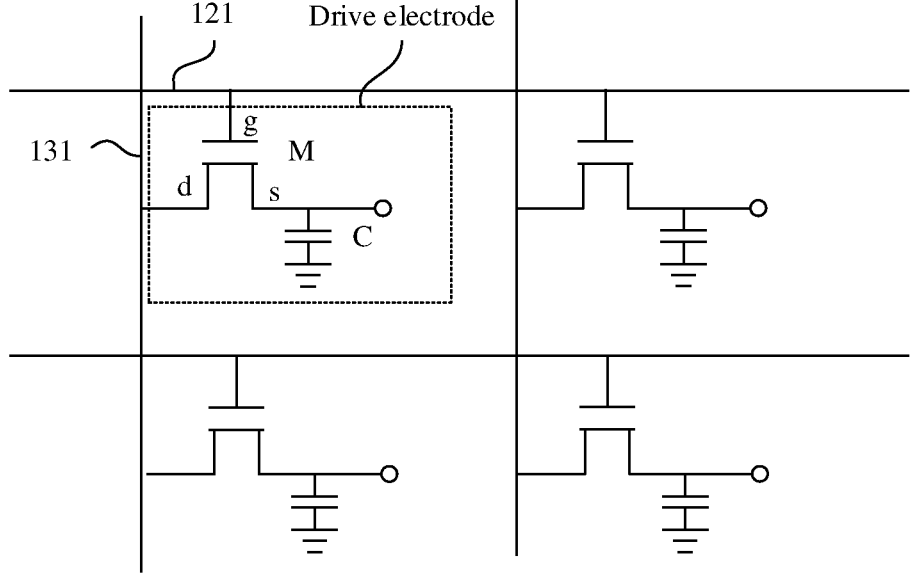
FIG. 5 is a schematic diagram of a structure of an equivalent circuit of a drive electrode array according to an embodiment of this application.

For example, as shown in FIG. 4, the drive electrode includes an electrode block 1111 (1112, 1113, 1114, 1115) and a switch transistor connected to the electrode block 1111. As shown in FIG. 2, the drive electrode array further includes gate leads 121 (122, 123, 124, 125) and drain leads 131 (132, 133, 134, 135) that are arranged vertically and horizontally in a cross manner. Refer to an equivalent circuit of the drive electrode provided in FIG. 5. The electrode block 1111 is connected to a source(s) 112 of the switch transistor, a gate (g) 113 of the switch transistor is connected to one gate lead 121, and a drain (d) 115 of the switch transistor is connected to one drain lead 131. A capacitor C shown in FIG. 5 is an equivalent capacitor formed by the common electrode 10 and the electrode block 1111. The drive electrode array includes drive electrodes arranged in an M×N array, where M is a quantity of rows of the drive electrodes, N is a quantity of columns of the drive electrodes, and M and N are positive integers. FIG. 2 and FIG. 4 are described by using a 5×5 drive electrode array as an example. A pixel arrangement manner of the drive electrode array 11 is that the drive electrode array 11 is an M×N pixel array, for example, M=5 and N=5. In this case, M×N is resolution of the drive electrode array. In the following solution, one electrode block in the drive electrode array is also referred to as one pixel. As shown in FIG. 2, the 5×5 drive electrode array includes 25 electrode blocks in total, namely, 1111, 1112, 1113, 1114, 1115, 1121, 1122, 1123, 1124, 1125, 1131, 1132, 1133, 1134, 1135, 1141, 1142, 1143, 1144, 1145, 1151, 1152, 1153, 1154, and 1155. A source of each switch transistor M is connected to a corresponding electrode block (as shown by a small circle in FIG. 2 and FIG. 5). The first fluid and the second fluid are usually liquids with similar density. In some examples, the fluid is also referred to as a liquid, the first fluid is also referred to as a polar fluid, and the second fluid is also referred to as a non-polar fluid. For example, the first fluid may be an aqueous solution to which a pigment or dye is added to absorb a specific light band. The pigment or dye may be carbon black, epolin 7527B, qcr solutions vod875s, hwsands sda8530, or the like. The solution may be water or aqueous solution to which salt is doped, such as NaCl, Na2SO4, LiCl, or KCl. To decrease a drive voltage, surfactants such as sodium dodecyl sulfate (sds), Tween20, and the like may be doped in an electrolyte. The second fluid 6 is an oil liquid. For example, the second fluid may be alkane, silicone oil, or the like.

The drive electrode array shown in FIG. 4 is used as an example. The switch transistor usually includes the gate 113, a gate insulation layer 111 covering the gate 113, a semiconductor channel activation layer 114 located on the gate insulation layer covering the gate 113, and the source 112 and the drain 115 located on the semiconductor channel activation layer 114. A channel is formed between the source 112 and the drain 115. In addition, a passivation layer covering the source 112 and the drain 115 may be further included, where the passivation layer is not shown in FIG. 4.

In addition, to ensure that the first fluid 5 and the second fluid 6 can flow smoothly between the first substrate 1 and the second substrate 4, the aperture further includes a first hydrophobic layer 2 and a second hydrophobic layer 8. In addition, the first hydrophobic layer 2 and the second hydrophobic layer 8 are hydrophobic to the first fluid and the second fluid. The first hydrophobic layer 2 is disposed between the first substrate 1 and the second fluid 6. The second hydrophobic layer 8 is disposed between the second fluid 6 and the drive electrode array 11, and is configured to seal the drive electrode array 11 between the second hydrophobic layer 8 and the second substrate 4. In addition, a sidewall frame 3 is further included. The sidewall frame 3 is disposed between the first hydrophobic layer 2 and the second substrate 4. The sidewall frame 3 seals the first fluid 5 and the second fluid 6 in space between the first hydrophobic layer 2 and the second substrate 4. Because the first fluid 5 is the electrolyte and is electrically conductive, to prevent the first fluid from affecting the drive electrode array 11, the aperture further includes an insulation dielectric layer 7. The insulation dielectric layer 7 is disposed between the second hydrophobic layer 8 and the drive electrode array 11. The gate insulation layer 111, the passivation layer, and the insulation dielectric layer 7 are usually made of transparent insulation materials, for example, silicon oxide, silicon nitride, or organic resin materials. The electrode block 1111 (1112, 1113, 1114, 1115) may be made of a transparent conductive material, such as indium tin oxide (ITO), a silver nanowire, a carbon nanotube, and graphene. Generally, transmittance of the ITO to light in the visible light band can reach 85% to 90%, or even more than 90%. The gate 113, the source 112, the drain 115, the gate lead 121, and the drain lead 131 are generally made of conductive materials, for example, may be made of metal or alloy materials, such as titanium nitride (TiN), tungsten (W), nickel (Ni), platinum (Pt), titanium (Ti), tungsten nitride (WN), ruthenium (Ru), ruthenium oxide (RuOx), iridium (Ir), iridium oxide (IrOx), tantalum nitride (TaN), cobalt (Co), aluminum (Al), copper (Cu), polysilicon (Si), copper molybdenum alloy, and silicon and metal compounds. To improve transmittance of the first area, the first area may be also made of a transparent conductive material that is the same as that of the electrode block 1111. Because the common electrode 10 is disposed in the second area, an opaque conductive material may be used for the common electrode 10. The first hydrophobic layer and the second hydrophobic layer may be made of a same material or different materials. Generally, the first hydrophobic layer and the second hydrophobic layer use fluorine-containing materials, such as Teflon AF, AF1600, Hyflon AD, AD40H, CYTOP, and CTX809S.

With reference to the equivalent circuit of the drive electrode shown in FIG. 5 and with reference to an operating principle of the switch transistor M, it can be learned that when a gating signal is applied to the gate lead 121, all switch transistors M in a same row connected to the gate lead 121 are in an on state. In other words, in this case, if a voltage is applied to the drain lead 131, an electric field is formed between the electrode block 1111 and the common electrode 10. FIG. 3 shows a state when no voltage is applied to the aperture. To be specific, the electrode blocks (1111, 1112, 1113, 1114, and 1115) and the common electrode 10 are at a same electric potential. For example, the five electrode blocks and the common electrode are all grounded. The first area close to the optical axis of the aperture is covered by the second fluid 6, and the second area at an edge of the aperture is covered by both the first fluid 5 and the second fluid 6. An upper part of the second fluid 6 in the first area is in contact with the first hydrophobic layer 2, and a lower part of the second fluid 6 in the first area is in contact with the second hydrophobic layer 8. An upper part of the second fluid 6 in the second area is in contact with the first hydrophobic layer 2, a lower part of the second fluid 6 in the second area is in contact with the first fluid 5, and a side part of the second fluid 6 in the second area is in contact with the sidewall frame 3. In this case, an opening of the aperture is the largest.

Figure 6:
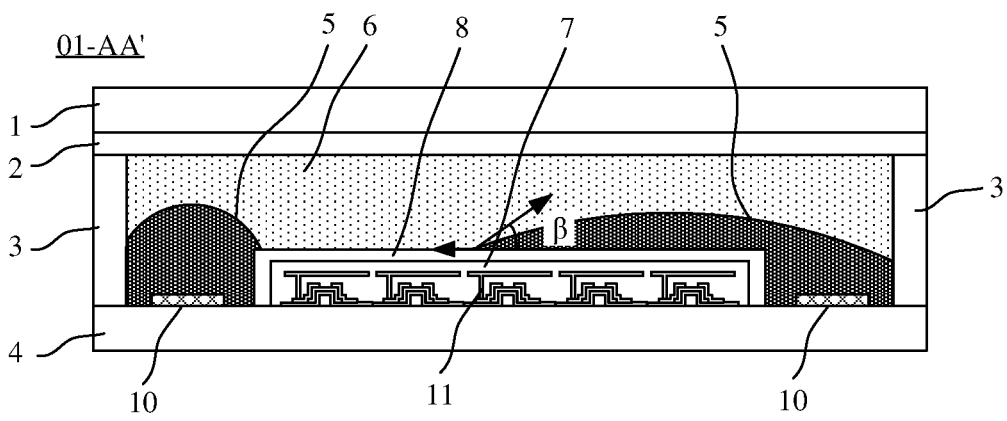
FIG. 6 is a schematic diagram 1 of a status of an aperture according to an embodiment of this application.
Figure 7:
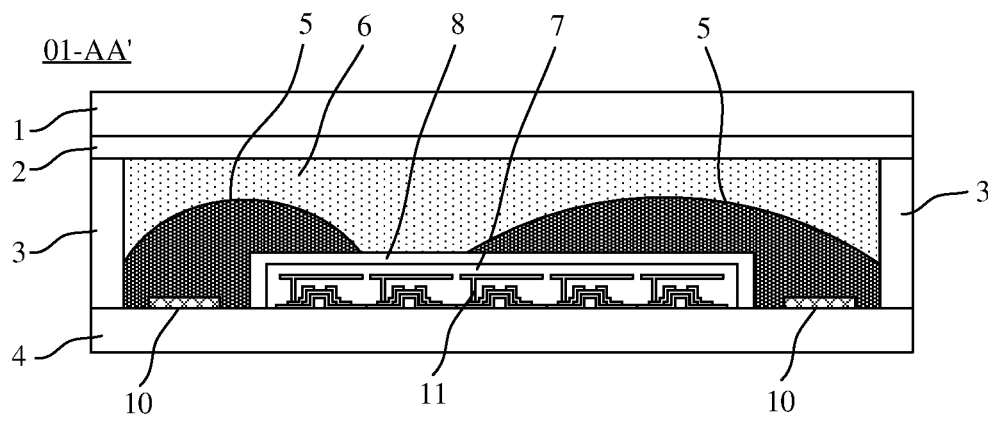
FIG. 7 is a schematic diagram 2 of a status of an aperture according to an embodiment of this application.

FIG. 6 and FIG. 7 show states when the aperture is controlled. When a voltage is applied to some drive electrodes in the drive electrode array, the first fluid flows to an area corresponding to the some drive electrodes, and covers the area corresponding to the some drive electrodes. An aperture pattern is formed in an area corresponding to drive electrodes other than the some drive electrodes in the drive electrode array. As shown in FIG. 6, a voltage is applied to the electrode block 1115 and the common electrode 10, for example, the electrode block 1115 is loaded with a V+ voltage, and other electrode blocks 1111, 1112, 1113, and 1114 and the common electrode 10 are all grounded. In this case, due to electrowetting effect, the first fluid 5 is driven to cover an area above the electrode block 1115. Relatively, the second fluid 6 is squeezed away to cover an area in which the first fluid 5 is removed. As shown in FIG. 7, the electrode blocks 1111, 1113, 1114, and 1115 are loaded with the V+ voltage, and both the electrode block 1112 and the common electrode 10 are grounded. Similarly, due to the electrowetting effect, the first fluid 5 is driven to cover areas above the electrodes blocks 1111, 1113, 1114, and 1115. Relatively, the second fluid 6 is squeezed away to cover the area in which the first fluid 5 is removed. In this way, after the first fluid covers the some electrode blocks, because the first fluid is the opaque electrolyte, the covered electrode blocks cannot transmit light. Other parts that are not covered by the first fluid may transmit light, and electrode blocks that are not covered by the first fluid form the aperture pattern when transmitting light.

When there is no voltage difference between the common electrode 10 and the electrode block, a surface area of the first fluid 5 covered by the second fluid 6 tends to be smaller, so that surface energy is minimized. In this case, a contact angle α (shown in FIG. 3) formed between the second fluid 6 and the first fluid 5 is the largest, and wettability of the second fluid 6 is not wet. Refer to FIG. 3. In this case, contact surface tensions of three phases are automatically balanced (a contact surface of the first fluid 5 and the second fluid 6, a contact surface of the first fluid 5 and the second hydrophobic layer 8, and a contact surface of the second fluid 6 and the second hydrophobic layer 8). In this case, the first fluid 5 is in a spherical coronal shape. When there is the voltage difference between the common electrode 10 and the electrode block, it is equivalent to charging a relative capacitor formed by the first fluid 5 and the electrode block (when the second hydrophobic layer 8 and the insulation dielectric layer 7 are included, a medium of the capacitor includes the second hydrophobic layer 8 and the insulation dielectric layer 7). A large amount of charge is accumulated on the contact surface of the first fluid 5 and the second hydrophobic layer 8. Rejection between like charges weakens the tension of the surface of the first fluid 5 and the second hydrophobic layer 8. In other words, addition of external electric field force breaks the surface tensions of the three phases that are originally balanced, the first fluid 5 tends to spread, a contact angle β (shown in FIG. 6) formed between the first fluid 5 and the second fluid 6 becomes smaller, and wettability of the second fluid 6 is wet. When the voltage difference between the common electrode 10 and the electrode block is canceled, the first fluid 5 automatically restores the initial spherical coronal shape due to a characteristic that the surface of the first fluid 5 tends to be smaller and the surface energy is minimized.

In this way, when a voltage is applied to a drive electrode in the drive electrode array 11, an electric field is formed between the drive electrode and the common electrode. Because the first fluid is the electrolyte, the first fluid flows to the drive electrode to which the voltage is applied under action of the electric field. In addition, because the first fluid is the opaque electrolyte, an area corresponding to the transparent drive electrode can be shielded. The second fluid still covers an area corresponding to a drive electrode to which no voltage is applied. Therefore, the area corresponding to the drive electrode that is not shielded by the first fluid can transmit light, to form the aperture pattern. Therefore, when the aperture pattern that needs to be formed is determined, a transparent position and an opaque position of the drive electrode array may be determined based on a shape of the aperture pattern, and a voltage is applied to a corresponding drive electrode of the drive electrode array based on the opaque position. In this way, the first fluid shields the drive electrode to which the voltage is applied, and an area corresponding to a drive electrode to which no voltage is applied is not shielded by the first fluid and can transmit light, and the required aperture pattern can be formed. Therefore, when required aperture patterns are different, transparent positions and opaque positions that are determined on the drive electrode array are also different. Therefore, for different aperture patterns, drive electrodes to which a voltage needs to be applied in the drive electrode array are also different. In this way, the aperture is controlled; and because no mechanical component is required, stability of the aperture is higher. In addition, transmittance of the aperture depends only on transmittance and reflection of materials at each functional layer and transmittance of the second fluid, so that good transmittance can be ensured.

An outer-facing edge of each electrode block of the drive electrode at an edge of the drive electrode array 11 may be a standard straight edge. Refer to FIG. 2. Outer shapes of the electrode blocks 1111, 1112, 1113, 1114, 1115, 1121, 1131, 1141, 1151, 1152, 1153, 1154, 1155, 1125, 1135 and 1145 each may be a standard straight edge. In this case, because the insulation dielectric layer 7 and the second hydrophobic layer 8 are usually made by using chemical vapor deposition CVD or a coating process, the insulation dielectric layer that is in contact with the electrode blocks of the drive electrode array 11 inward also has a standard straight edge. Similarly, the second hydrophobic layer that is in contact with the insulation dielectric layer inward also has a standard straight edge.

Figure 8:
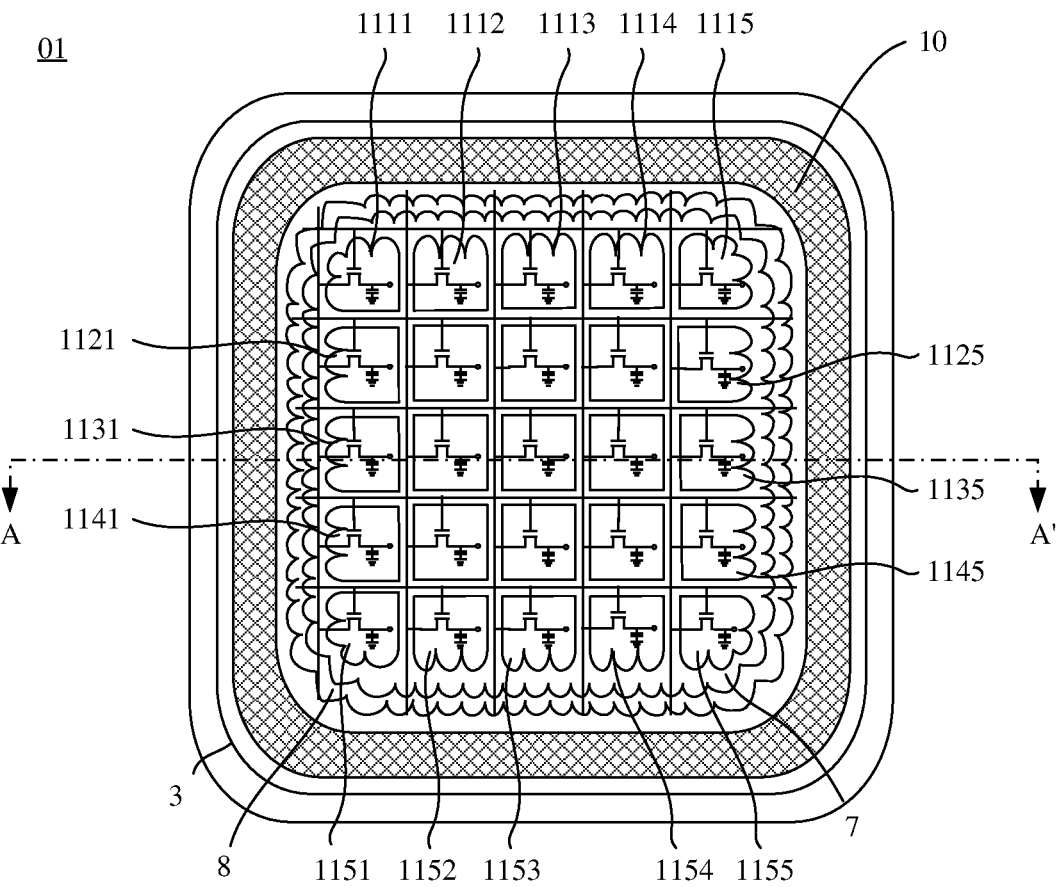
FIG. 8 is a schematic diagram of a top-viewed structure of an aperture according to another embodiment of this application.

To ensure that when a voltage is applied to an electrode block and the common electrode, the first fluid can quickly respond to an electric field generated by the electrode block and the common electrode, and flow above the electrode block. This can ensure reliability of aperture control. In addition, when the voltage is stopped to apply to the electrode block and the common electrode, the first fluid can quickly return to an original position, to ensure repeatability of aperture control. As shown in FIG. 8, the outer-facing edge of each electrode block of the drive electrode at the edge of the drive electrode array 11 has a structure in which recesses and protrusions are arranged in an overlapping manner. For example, the outer shapes of the electrode blocks 1111, 1112, 1113, 1114, 1115, 1121, 1131, 1141, 1151, 1152, 1153, 1154, 1155, 1125, 1135, and 1145 each may be a structure in which recesses and protrusions are arranged in an overlapping manner. Similarly, the insulation dielectric layer that is in contact with the electrode blocks of the drive electrode array 11 inward is also in a structure in which recesses and protrusions are arranged in an overlapping manner. Similarly, the second hydrophobic layer that is in contact with the insulation dielectric layer inward is also in a structure in which recesses and protrusions are arranged in an overlapping manner. In the structure similar to a "hand shape" in which the recesses and the protrusions are arranged in the overlapping manner, the drive electrodes and the first fluid intersect to some extent. This helps the first fluid quickly flow to a corresponding electrode block under action of an electric field. When the electric field is lost, the first fluid can flow back to the original position smoothly. The structure in which the recesses and the protrusions are arranged in the overlapping manner in the figure is described by using arc-shaped concaves or protrusions as an example. The recesses or the protrusions may also be of a sawtooth shape, a square shape, or the like.

Figure 9:
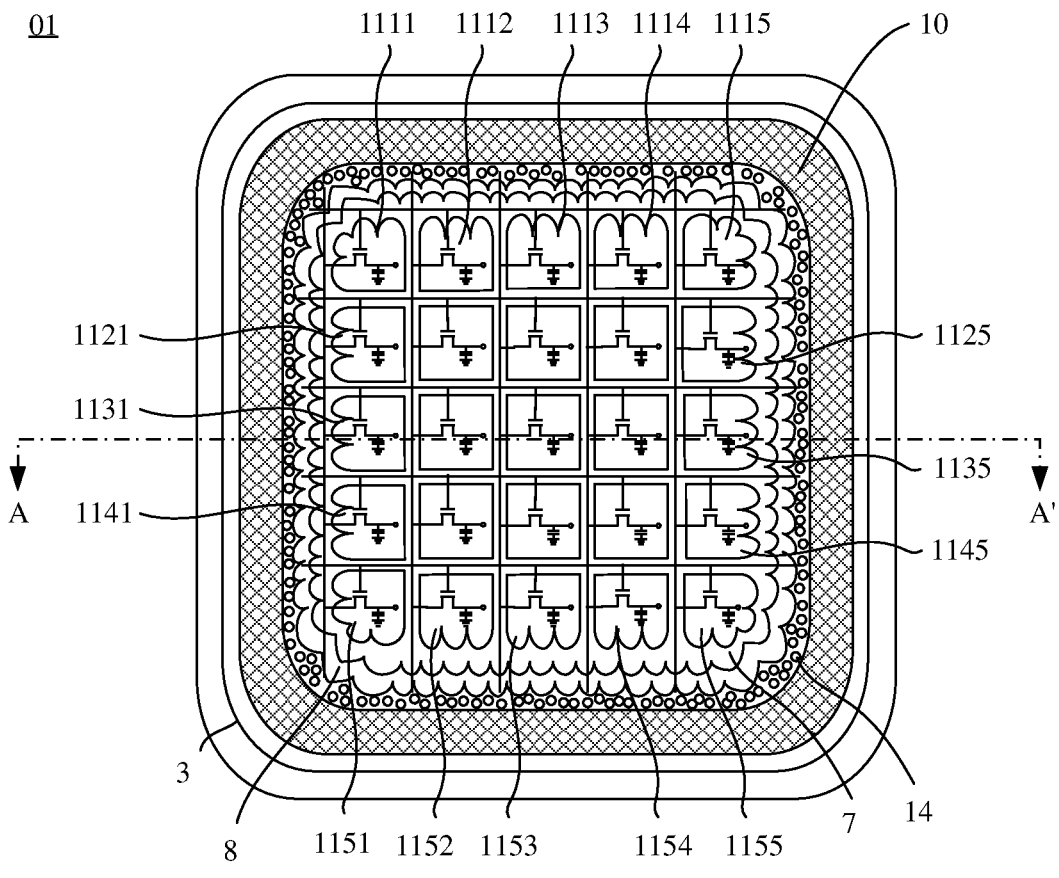
FIG. 9 is a schematic diagram of a top-viewed structure of an aperture according to still another embodiment of this application.

In addition, to improve reliability and repeatability of aperture control, and prevent the first fluid from entering the first area when no electric field voltage is applied to the electrode block, as shown in FIG. 9, the aperture further includes a microstructure column 14. The microstructure column 14 is disposed on the second substrate 4, and is located between the common electrode 10 and the second hydrophobic layer 8. The microstructure column 14 is hydrophilic to the second fluid 8. In this way, in an area between the common electrode 10 and the second hydrophobic layer 8, because the microstructure column having hydrophilicity to the second fluid is disposed, when no electric field voltage is applied to the electrode block, the microstructure column may adsorb the second fluid to form a barrier to prevent the first fluid from entering the first area. In this way, reliability and repeatability of aperture control are ensured. To further improve the foregoing effect, because the first fluid is not insoluble with the second fluid, the microstructure column has hydrophobicity to the first fluid. The hydrophilicity and hydrophobicity mean wettability of the second fluid or the first fluid to the microstructure column. Hydrophilicity means that wettability of the second fluid to the microstructure column is wet, and hydrophobicity means that wettability of the first fluid to the microstructure column is not wet. Wettability of a fluid to a solid structure may be mainly measured by using a contact angle between the fluid and the solid. In a Young model, a contact surface between the fluid and the solid is an ideal smooth surface. When the contact angle (also referred to as an intrinsic contact angle) is [0, 90], the fluid is wet to the solid. When the contact angle is (90, 180], the fluid is not wet to the solid. Generally, to improve hydrophilicity or hydrophobicity under the foregoing contact angle conditions, the contact surface between the solid and the fluid may be usually set to a rough state. For example, the microstructure column provided in this embodiment of this application is added. In a Wenzel model, the fluid can enter a gap between microstructure columns, to increase the contact area between the fluid and the solid. After the microstructure column is added, when the contact angle is [0, 90], the contact angle decreases with an increase of roughness of the contact surface in the Wenzel model (for example, increasing a height of the microstructure column and decreasing spacings between the microstructure columns). In this case, it indicates that the hydrophilicity of the fluid to the solid is improved. When the contact angle is (90, 180], the contact angle increases with the increase of roughness of the contact surface in the Wenzel model (for example, increasing the height of the microstructure column and decreasing the spacings between the microstructure columns). In this case, it indicates that the hydrophobicity of the fluid to the solid is improved. In addition, in a Cassie model, the fluid is in contact with the top of the microstructure columns, and bubbles are formed in spacings between the adjacent microstructure columns to decrease the contact area of the fluid and the solid. In this case, it indicates that the hydrophobicity of the solid to the fluid is improved. Correspondingly, when the contact angle is (90, 180], the hydrophobicity of the solid to the fluid can be improved in the Cassie model. In this embodiment of this application, for example, in the Cassie model, the contact angle between the second fluid and the microstructure column may range from 120° to 160°. It should be noted that, the contact angle between the fluid and the solid when the contact surface is rough is an apparent contact angle, which is measured after impact of surface roughness of the solid in practice is considered. For example, the height of the microstructure column provided in this embodiment of this application ranges from 10 μm to 250 μm, and the spacing between the microstructure columns ranges from 10 μm to 250 μm.

With reference to FIG. 3, a gap h further exists between the electrode blocks. To prevent a diffraction halo phenomenon caused by the tiny periodic gap h to final imaging of the imaging lens, the gap h between the electrode blocks is filled with an insulation coating. A difference between a refractive index of the insulation coating and a refractive index of the electrode block is less than a preset value. For example, a value range of the preset value is 0.1×(1±20%). When the refractive index of the insulation coating is equal to the refractive index of the electrode block, the diffraction halo phenomenon caused by the periodic gap h to the final imaging of the imaging lens can be completely avoided.

Figure 10:
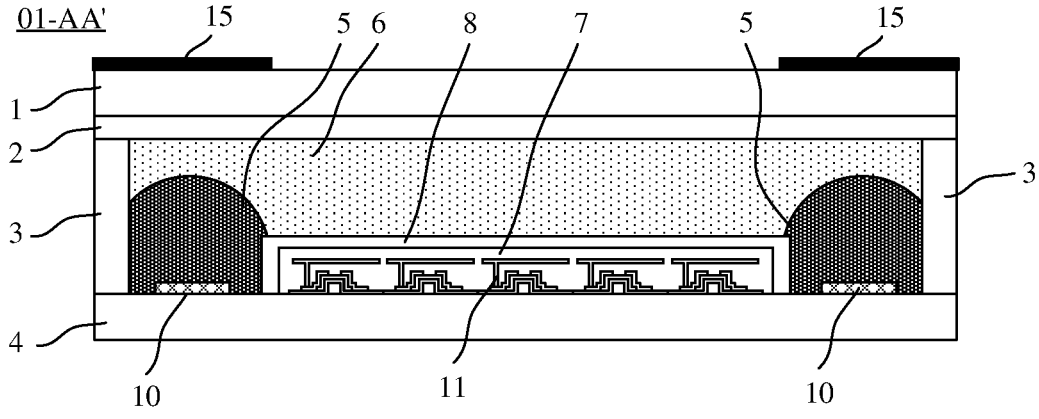
FIG. 10 is a schematic diagram of a structure of a cross-section at AA' in the aperture shown in FIG. 2 according to another embodiment of this application.

To avoid that the first fluid 5 in the second area aa' at the edge of the aperture cannot completely shield ambient stray light, the aperture further includes a light shield layer 15, where the light shield layer 15 is disposed in the second area aa'. Refer to FIG. 10. The light shield layer 15 is disposed on a side that is of the first substrate 1 and that is away from the second substrate. Alternatively, refer to FIG. 11. The light shield layer 15 is disposed on a side that is of the second substrate 4 and that is away from the first substrate 1.

Figures 11, 12:
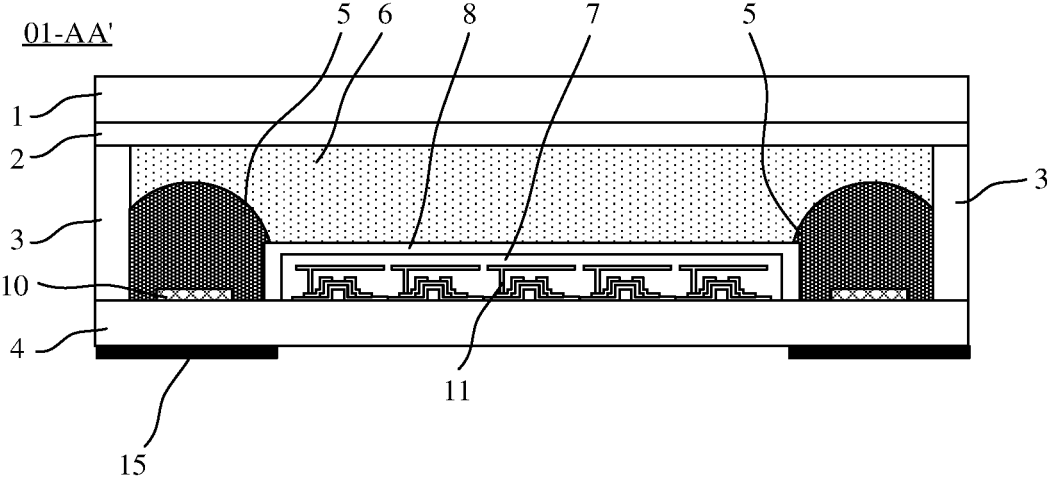
FIG. 11 is a schematic diagram of a structure of a cross-section at AA' in the aperture shown in FIG. 2 according to still another embodiment of this application.
FIG. 12 shows voltage distribution of electrode blocks in a drive electrode array in a 16×16 pixel arrangement manner corresponding to an aperture pattern according to an embodiment of this application.
Figures 13, 14:
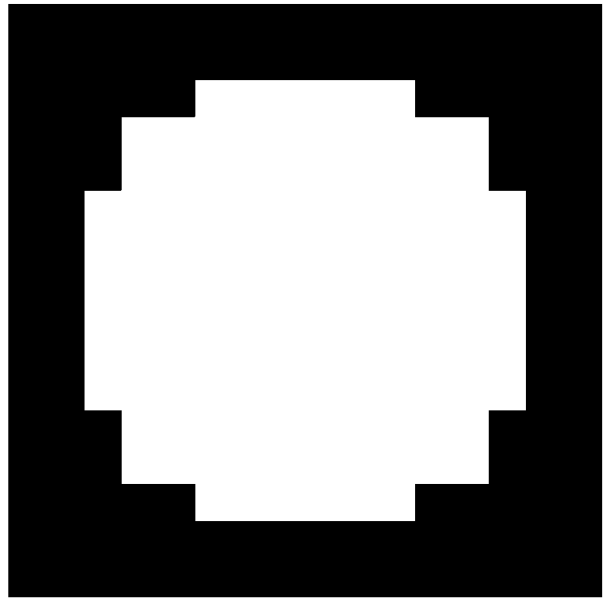
FIG. 13 provides an aperture pattern formed by voltage distribution of the electrode blocks in the drive electrode array shown in FIG. 12.
FIG. 14 shows voltage distribution of electrode blocks in a drive electrode array in a 16×16 pixel arrangement manner corresponding to an aperture pattern according to another embodiment of this application.
Figures 15, 16:
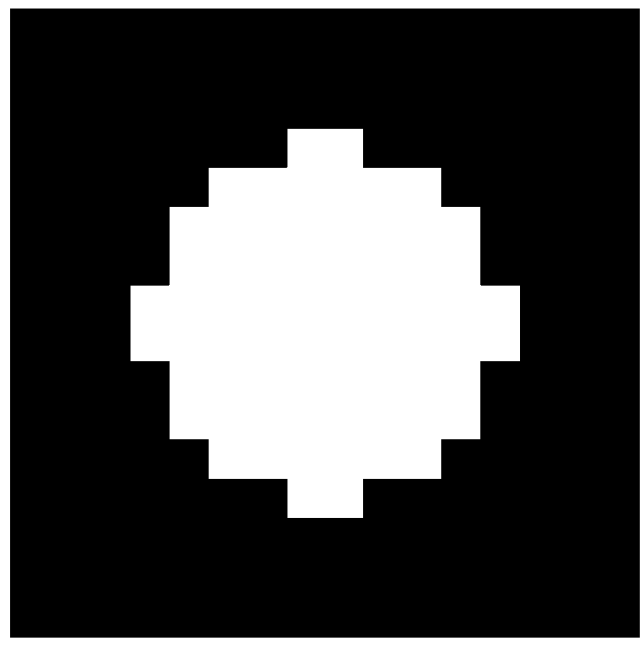
FIG. 15 provides an aperture pattern formed by voltage distribution of the electrode blocks in the drive electrode array shown in FIG. 14.
FIG. 16 shows voltage distribution of electrode blocks in a drive electrode array in a 16×16 pixel arrangement manner corresponding to an aperture pattern according to still another embodiment of this application.
Figures 17, 18:
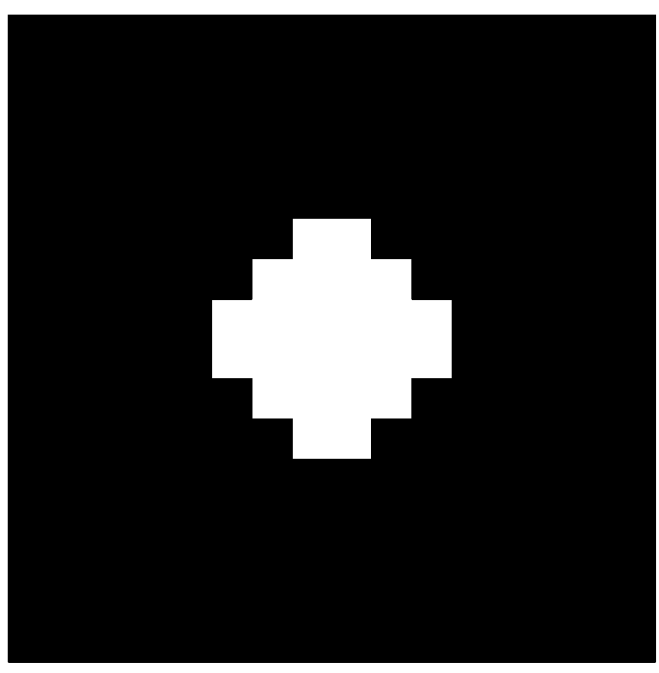
FIG. 17 provides an aperture pattern formed by voltage distribution of the electrode blocks in the drive electrode array shown in FIG. 16.
FIG. 18 shows voltage distribution of electrode blocks in a drive electrode array in a 16×16 pixel arrangement manner corresponding to an aperture pattern according to yet another embodiment of this application.
Figures 19, 20:
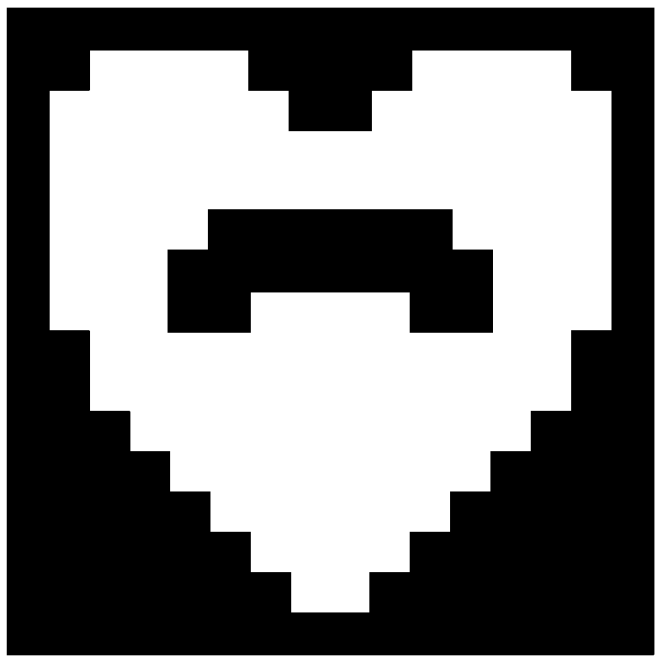
FIG. 19 provides an aperture pattern formed by voltage distribution of the electrode blocks in the drive electrode array shown in FIG. 18.
FIG. 20 shows voltage distribution of electrode blocks in a drive electrode array in a 16×16 pixel arrangement manner corresponding to an aperture pattern according to still yet another embodiment of this application.
Figures 21, 22:
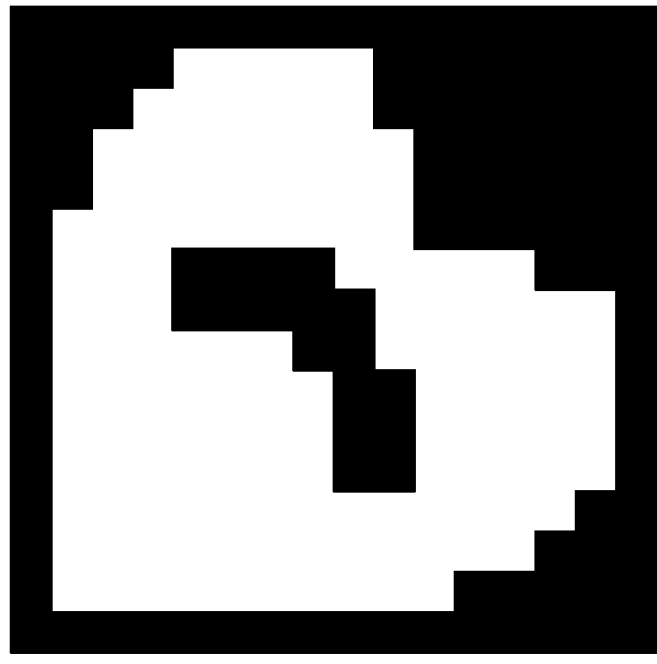
FIG. 21 provides an aperture pattern formed by voltage distribution of the electrode blocks in the drive electrode array shown in FIG. 20.
FIG. 22 shows voltage distribution of electrode blocks in a drive electrode array in a 16×16 pixel arrangement manner corresponding to an aperture pattern according to a further embodiment of this application.
Figure 23:
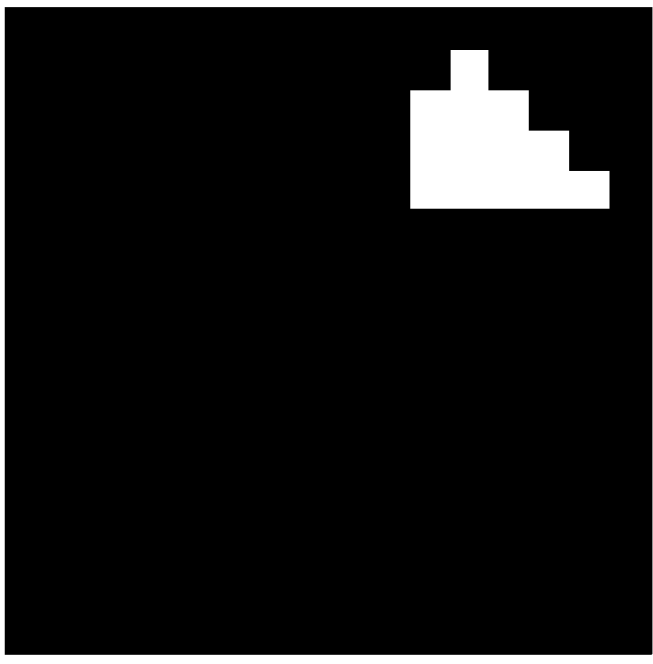
FIG. 23 provides an aperture pattern formed by voltage distribution of the electrode blocks in the drive electrode array shown in FIG. 22.
Figure 24:
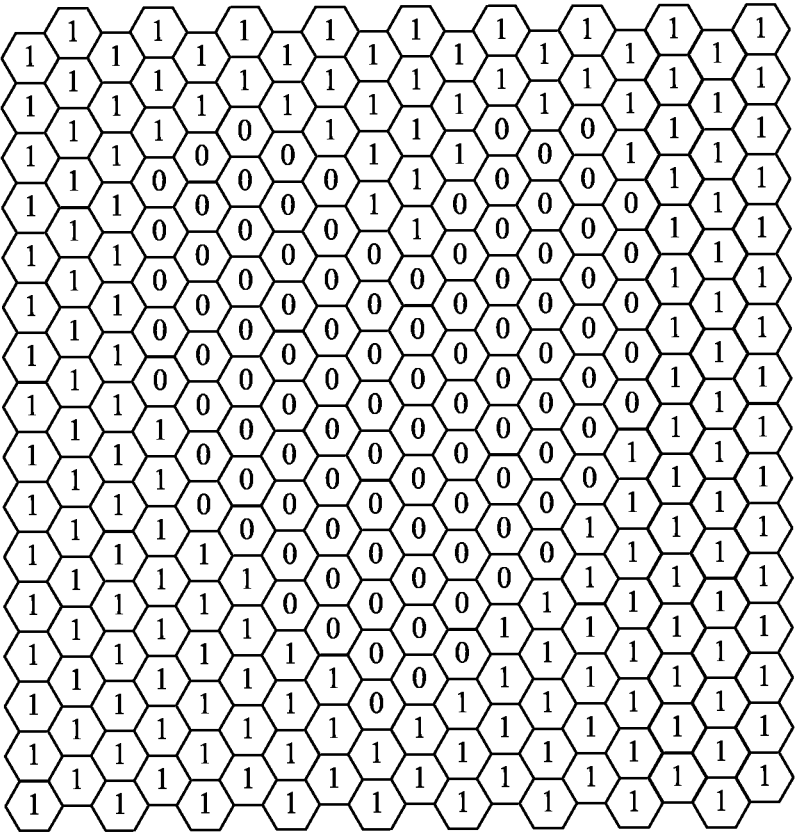
FIG. 24 shows voltage distribution of electrode blocks in a drive electrode array in a 16×18 pixel arrangement manner corresponding to an aperture pattern according to a still further embodiment of this application.

Based on the foregoing aperture, an arrangement manner of the drive electrode array 11 that may be provided in this embodiment of this application may be square arrangement, in other words, the electrode block of each drive electrode in the drive electrode array 11 may be in a square shape. Another regular polygon form, for example, a regular hexagon, may also be used. FIG. 13, FIG. 15, FIG. 17, FIG. 19, FIG. 21, FIG. 23, and FIG. 25 show an aperture pattern. FIG. 12 shows voltage distribution of electrode blocks in the drive electrode array 11 in a 16×16 pixel arrangement manner corresponding to the aperture pattern shown in FIG. 13. FIG. 14 shows voltage distribution of electrode blocks in the drive electrode array 11 in the 16×16 pixel arrangement manner corresponding to the aperture pattern shown in FIG. 15. FIG. 16 shows voltage distribution of electrode blocks in the drive electrode array 11 in the 16×16 pixel arrangement manner corresponding to the aperture pattern shown in FIG. 17. FIG. 18 shows voltage distribution of electrode blocks in the drive electrode array 11 in the 16×16 pixel arrangement manner corresponding to the aperture pattern shown in FIG. 19. FIG. 20 shows voltage distribution of electrode blocks in the drive electrode array 11 in the 16×16 pixel arrangement manner corresponding to the aperture pattern shown in FIG. 21. FIG. 22 shows voltage distribution of electrode blocks in the drive electrode array 11 in the 16×16 pixel arrangement manner corresponding to the aperture pattern shown in FIG. 23. FIG. 24 shows voltage distribution of electrode blocks in the drive electrode array 11 in a 16×18 pixel arrangement manner corresponding to the aperture pattern shown in FIG. 25. The electrode blocks in FIG. 12, FIG. 14, FIG. 15, FIG. 16, FIG. 18, FIG. 20, and FIG. 22 are squares. The electrode blocks in FIG. 24 are regular hexagons. "1" indicates that an electric field voltage exists on a corresponding electrode block, and "0" indicates that no electric field voltage exists on a corresponding electrode block. FIG. 13, FIG. 15, and FIG. 17 show size adjustment of a circular aperture pattern: FIG. 19, FIG. 21, FIG. 23, and FIG. 25 show an abnormal-shaped aperture pattern; FIG. 19 and FIG. 21 show rotation of the abnormal-shaped aperture pattern; and FIG. 23 shows an eccentric abnormal-shaped aperture pattern.

Based on the foregoing aperture, an embodiment of this application provides an aperture control method. The method includes: applying an electric field voltage to some drive electrodes in the drive electrode array: moving the first fluid to an area corresponding to the some drive electrodes to cover the area corresponding to the some drive electrodes; and forming an aperture pattern in an area corresponding to drive electrodes other than the some drive electrodes in the drive electrode array.

Specifically, the some drive electrodes may be determined based on the aperture pattern. The circular aperture pattern shown in FIG. 13 is used as an example. The aperture is mainly used to control light entering an imaging lens through the aperture. Therefore, in the aperture pattern shown in FIG. 13, a white area is a transparent area, in other words, light may enter the imaging lens by passing through the area; and the white area is the aperture pattern. A black area indicates an opaque area, in other words, light is absorbed or reflected when irradiating the area. When the aperture pattern shown in FIG. 13 is formed by using the aperture provided in this embodiment of this application, the electric field voltage may be applied, based on the voltage distribution of the electrode blocks in the drive electrode array 11 shown in FIG. 12, to drive electrodes (namely, the some drive electrodes) corresponding to the black area in the drive electrode array; and no electric field voltage is applied to drive electrodes corresponding to the white area in the drive electrode array. "1" indicates that an electric field voltage exists on a corresponding electrode block, and "0" indicates that no electric field voltage exists on a corresponding electrode block. In this way, the first fluid is moved to the electrode blocks in FIG. 12 corresponding to the black area in FIG. 13, and the corresponding electrode blocks are covered by the first fluid. Because the first fluid is the opaque electrolyte that can absorb or reflect light, light is shielded from entering the imaging lens. However, no electric field voltage exists on the electrode blocks in the white area, and the electrode blocks are not covered by the first fluid. Therefore, light can enter through the imaging lens, and the aperture is controlled. Similarly, after a size of the aperture pattern is adjusted, voltage distribution of the drive electrodes may be reconfigured based on a size of an adjusted aperture pattern. For example, circular aperture patterns corresponding to FIG. 15 and FIG. 17 are sequentially formed after a diameter of the circular aperture pattern in FIG. 13 is gradually decreased. A control principle of forming the special-shaped aperture patterns in FIG. 19, FIG. 21, FIG. 23, and FIG. 25 is similar to that of forming the aperture pattern shown in FIG. 13.

In addition, different control manners need to be used for the aperture based on whether an isolation area exists inside the aperture pattern. The isolation area is an opaque area surrounded by the aperture pattern. Because the opaque area needs to be shielded by using the first fluid, when the isolation area exists inside the aperture pattern, the first fluid needs to be separated to form the aperture pattern. Different control methods need to be performed depending on whether the first fluid needs to be separated. Specifically, in the aperture patterns shown in FIG. 13, FIG. 15, FIG. 17, FIG. 23, and FIG. 25, no isolation area exists inside the aperture patterns; and isolation areas exist inside the aperture patterns shown in FIG. 19 and FIG. 21.

Example 1: For an aperture pattern in which no isolation area exists, the some drive electrodes to which the electric field voltage needs to be applied include drive electrodes on a periphery of the area corresponding to the aperture pattern in the drive electrode array. In this case, the aperture pattern can be formed without separating the first fluid. For the some drive electrodes, the electric field voltage may be sequentially and simply applied from a periphery of the drive electrode array to a center of the drive electrode array in sequence.

Figures 25, 26:
FIG. 25 provides an aperture pattern formed by voltage distribution of the electrode blocks in the drive electrode array shown in FIG. 24.
FIG. 26 is a schematic diagram 1 of voltage distribution of electrode blocks in a drive electrode array in an aperture control method according to an embodiment of this application.

Specifically, an aperture control method for forming the aperture pattern shown in FIG. 13 is used for description. The drive electrode array 11 in the 16×16 pixel arrangement manner corresponding to the aperture pattern shown in FIG. 13 is shown in FIG. 12. The following is described with reference to FIG. 26 to FIG. 28. An electrode block (a pixel) marked with a slash represents that an electric potential difference exists between the electrode block and the common electrode by applying a voltage to the electrode block, "1" represents that a voltage of a corresponding electrode block remains valid, and "O" indicates that no voltage is applied to a corresponding electrode block. For the aperture pattern shown in FIG. 13, the electric field voltage (as shown in FIG. 26) is first applied to outermost electrode blocks (electrode blocks in the $(M/2)^{th}$ circle), where M=16. After the electric field voltage is applied to the outermost electrode blocks, a large amount of charge is accumulated on a contact surface between the first fluid and the second hydrophobic layer in an area in which the outermost electrode blocks are located, and rejection between like charges weakens the surface tension between the first fluid and the second hydrophobic layer. In other words, addition of external electric field force breaks the surface tensions of the three phases that are originally balanced, and the first fluid tends to spread to the area corresponding to the outermost electrode blocks. After the first fluid covers the area corresponding to the outermost electrode blocks, the contact angle between the first fluid and the second fluid is changed (is decreased), the contact surface tensions of the three phases are automatically balanced, and the first fluid does not flow anymore. Then, the electric field voltage is applied to secondary peripheral electrode blocks (electrode blocks in the $(M/2-1)^{th}$ circle), and the electric field voltage of the outermost electrode blocks (the electrode blocks in the $(M/2)^{th}$ circle) is maintained (as shown in FIG. 27). After the electric field voltage is applied to the secondary peripheral electrode blocks, a large amount of charge is accumulated on a contact surface between the first fluid and the second hydrophobic layer in an area in which the secondary peripheral electrode blocks are located, and rejection between the like charges weakens the surface tension between the first fluid and the second hydrophobic layer. In other words, addition of the external electric field force breaks the surface tensions of the three phases that are originally balanced, and the first fluid tends to spread to the area corresponding to the secondary peripheral electrode blocks. After the first fluid covers the area corresponding to the secondary peripheral electrode blocks, the contact angle between the first fluid and the second fluid is changed (is further decreased), the contact surface tensions of the three phases are automatically balanced, and the first fluid does not flow anymore. Then, the electric field voltage is applied to electrode blocks in the more inner circle (electrode blocks in the $(M/2-2)^{th}$ circle) (as shown in FIG. 28). After the electric field voltage is applied to the electrode blocks in the $(M/2-2)^{th}$ circle, a large amount of charge is accumulated on a contact surface between the first fluid and the second hydrophobic layer in an area in which the electrode blocks in the $(M/2-2)^{th}$ circle is located, and rejection between the like charges weakens the surface tension between the first fluid and the second hydrophobic layer. In other words, addition of the external electric field force breaks the surface tensions of the three phases that are originally balanced, and the first fluid tends to spread to the area corresponding to the $(M/2-2)^{th}$ circle of electrode blocks. After the first fluid covers the area corresponding to the $(M/2-2)^{th}$ circle of electrode blocks, the contact angle between the first fluid and the second fluid is changed (is further decreased), the contact surface tensions of the three phases are automatically balanced, and the first fluid does not flow anymore. Finally, the electric field voltages are maintained on the outermost electrodes (the electrode block in the $(M/2)^{th}$ circle), the secondary peripheral electrodes (the electrode blocks in the $(M/2-1)^{th}$ circle), and the electrode blocks in the $(M/2-2)^{th}$ circle.

Example 2: For an aperture pattern in which an isolation area exists, the first fluid needs to be separated to form the aperture pattern. The some drive electrodes include drive electrodes on a periphery of the area corresponding to the aperture pattern in the drive electrode array, and drive electrodes corresponding to the isolation area. In this case, the first fluid may be first moved to electrode blocks corresponding to the isolation area, and is isolated. Then, the electric field voltage is sequentially applied, according to the method provided in Example 1, to the drive electrodes on the periphery of the area corresponding to the aperture pattern from a periphery of the drive electrode array to a center of the drive electrode array. With reference to the aperture pattern shown in FIG. 19, the isolation area is an area that can be formed only after the first fluid is separated or split when the first fluid moves from the second area at the edge of the aperture to the first area at a center of the aperture. However, in FIG. 19, the aperture pattern is a continuous area when the first fluid moves from the second area at the edge of the aperture to the first area at the center of the aperture, namely, an area that can be formed only by continuously moving the first fluid. The aperture control method includes: determining one channel in the drive electrode array based on the isolation area, where the channel is connected to the isolation area and the first fluid; sequentially applying the electric field voltage to drive electrodes on the channel from the periphery of the drive electrode array to the center of the drive electrode array: sequentially applying the electric field voltage to the drive electrodes corresponding to the isolation area from approaching the channel to away from the channel; and sequentially applying, based on the aperture pattern, the electric field voltage to the drive electrodes at the periphery of the area corresponding to the aperture pattern in the drive electrode array from the periphery of the drive electrode array to the center of the drive electrode array. Specifically, the channel may be determined based on a distance between the first fluid and the isolation area, or the channel may be determined based on a distance between an edge that is of the aperture pattern and that is away from the isolation area and the isolation area. To improve an aperture control response speed, the foregoing channel may be a channel through which the first fluid is closest to the isolation area, or a channel through which an outer edge of the aperture pattern is closest to the isolation area.

Figure 29:
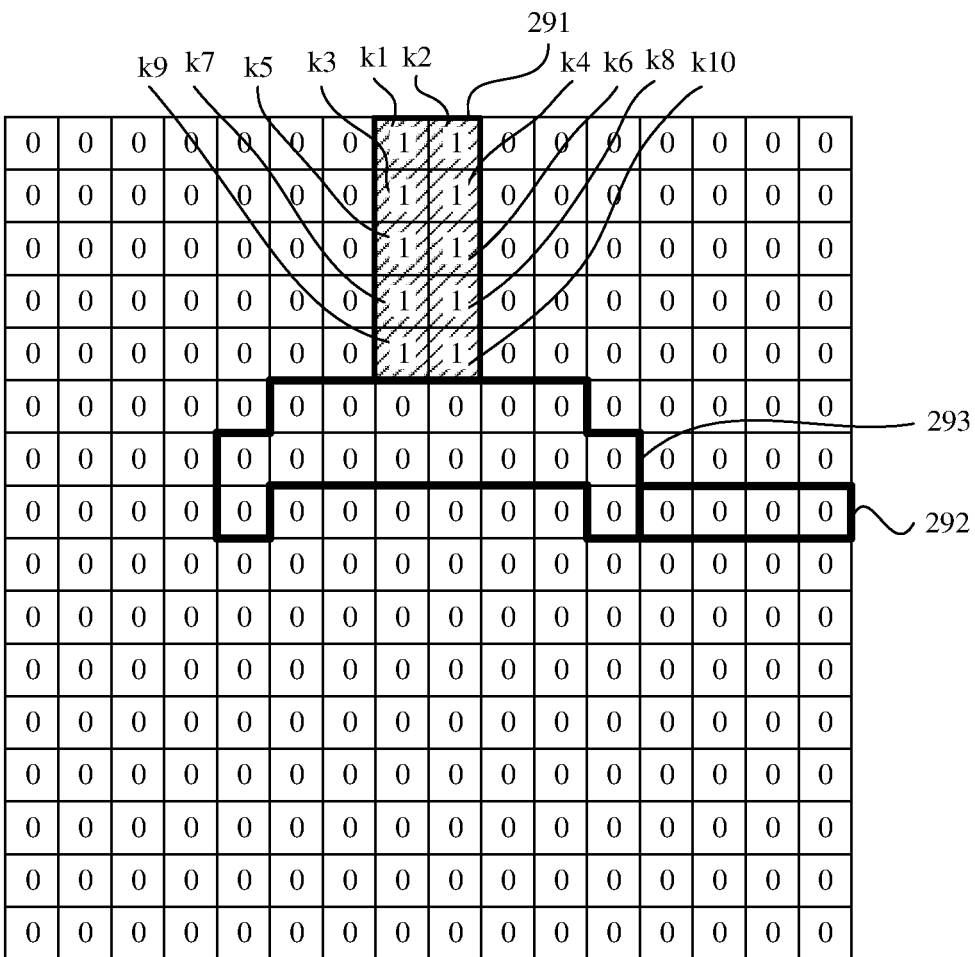
FIG. 29 is a schematic diagram 1 of voltage distribution of electrode blocks in a drive electrode array in an aperture control method according to another embodiment of this application.

Specifically, the aperture control method for forming the aperture pattern shown in FIG. 19 is used for description. The drive electrode array 11 in the 16×16 pixel arrangement manner corresponding to the aperture pattern shown in FIG. 19 is shown in FIG. 18. The following is described with reference to FIG. 29 to FIG. 37. An electrode block (a pixel) marked with a slash represents that an electric potential difference exists between the electrode block and the common electrode by applying an electric field voltage to the electrode block, an electrode block with a grid indicates that an electric field voltage is removed from the electrode block to remove an electric potential difference between the electrode block and the common electrode, "1" indicates that a voltage of a corresponding electrode block remains valid, and "0" indicates that no voltage is applied to a corresponding electrode block. For the aperture pattern shown in FIG. 19, one channel is first determined in the drive electrode array based on the isolation area. A specific manner is as follows: For example, one channel is determined by connecting the first fluid to the isolation area along a direction, where the direction may be a horizontal direction, a vertical direction, or a direction at an angle to the horizontal direction or the vertical direction. A channel 1 291 in FIG. 29 includes two columns of electrode blocks. One or more columns of electrode blocks may also be used, or one or more rows of electrode blocks may be used. As described above, the channel may be a channel (for example, a channel 2 292 in FIG. 29) in a direction in which the first fluid is closest to the isolation area 293, or a channel in a direction in which the outer edge of the aperture pattern is closest to the isolation area 293 (for example, the channel 1 291 in FIG. 29; and a direction in which spacing between electrode blocks is the shortest is a direction closest to the isolation area 293). The following uses the channel 1 291 as an example for description. In this case, the electric field voltage is applied to the electrode blocks on the channel in the direction to connect the first fluid to the electrode blocks in the isolation area, which is shown in FIG. 29. For details, refer to the method shown in Example 1. The electric field voltage is applied from the outer circles to the inner circles one by one. The electric field voltage of the electrodes blocks on the channel is maintained. Specifically, as shown in FIG. 29, the electric field voltage is first applied to outermost electrode blocks (electrode blocks in the $(M/2)^{th}$ circle, namely, K1 and K2) in the channel 1 291, where M=16. After the electric field voltage is applied to the outermost electrode blocks (K1 and K2) in the channel 1 291, a large amount of charge is accumulated on a contact surface between the first fluid and the second hydrophobic layer in an area in which the outermost electrode blocks (K1 and K2) in the channel 1 291 are located, and rejection between like charges weakens the surface tension between the first fluid and the second hydrophobic layer. In other words, addition of external electric field force breaks the surface tensions of the three phases that are originally balanced, and the first fluid tends to spread to the area corresponding to the outermost electrode blocks (K1 and K2) in the channel 1 291. After the first fluid covers the area corresponding to the outermost electrode blocks (K1 and K2) in the channel 1 291, the contact angle between the first fluid and the second fluid is changed (is decreased), the contact surface tensions of the three phases are automatically balanced, and the first fluid does not flow anymore. Then, the electric field voltage is applied to secondary peripheral electrode blocks (the $(M/2-1)^{th}$ circle electrode block (k3 and k4)) in the channel 1 291, and the electric field voltage is maintained on the outermost peripheral electrode blocks (the blocks in the $(M/2)^{th}$ circle) in the channel 1 291. After the electric field voltage is applied to the secondary peripheral electrode blocks (k3 and k4) in the channel 1 291, a large amount of charge is accumulated on a contact surface between the first fluid and the second hydrophobic layer in an area in which the secondary peripheral electrode blocks (k3 and k4) in the channel 1 291 are located, and rejection between the like charges weakens the surface tension between the first fluid and the second hydrophobic layer. In other words, addition of the external electric field force breaks the surface tensions of the three phases that are originally balanced, and the first fluid tends to spread to the area corresponding to the secondary peripheral electrode blocks (k3 and k4) in the channel 1 291. After the first fluid covers the area corresponding to the secondary peripheral electrode blocks (k3 and k4) in the channel 1 291, the contact angle between the first fluid and the second fluid is changed (is decreased), the contact surface tensions of the three phases are automatically balanced, and the first fluid does not flow anymore. Then, the electric field voltage is applied to electrode blocks in the more inner circle (electrode blocks in the $(M/2-2)^{th}$ circle, namely, k5 and k6) in the channel 1 291. After the electric field voltage is applied to the electrode blocks in the $(M/2-2)^{th}$ circle in the channel 1 291, a large amount of charge is accumulated on a contact surface between the first fluid and the second hydrophobic layer in an area in which the electrode blocks in the $(M/2-2)^{th}$ circle in the channel 1 291, and rejection between the like charges weakens the surface tension between the first fluid and the second hydrophobic layer. In other words, addition of the external electric field force breaks the surface tensions of the three phases that are originally balanced, and the first fluid tends to spread to the area corresponding to the electrode blocks in the $(M/2-2)^{th}$ circle in the channel 1 291. After the first fluid covers the area corresponding to the electrode blocks in the $(M/2-2)^{th}$ circle in the channel 1 291, the contact angle between the first fluid and the second fluid is changed (is decreased), the contact surface tensions of the three phases are automatically balanced, and the first fluid does not flow anymore. Then, the electric field voltage is sequentially applied to the electrode blocks k7 and k8, and k9 and k10 in the channel 1 291 in the foregoing manner. Finally, the electric field voltages of k1 to k10 are maintained. Then, the electric field voltage is first applied to electrode blocks closest to the channel in the isolation area 293, as shown in FIG. 30. After the electric field voltage is applied to the electrode blocks closest to the channel, a large amount of charge is accumulated on a contact surface between the first fluid and the second hydrophobic layer in an area in which the electrode blocks closest to the channel are located, and rejection between the like charges weakens the surface tension between the first fluid and the second hydrophobic layer. In other words, addition of the external electric field force breaks the surface tensions of the three phases that are originally balanced, and the first fluid tends to spread to the area in which the electrode blocks closest to the channel are located. After the first fluid covers the area in which the electrode blocks closest to the channel are located, the contact surface tensions of the three phases are automatically balanced, and the first fluid does not flow anymore. The electric field voltage of the electrode blocks on the channel is maintained, the electric field voltage of the electrode blocks closest to the channel in the isolation area 293 is maintained, and the electric field voltage is sequentially applied to remaining electrode blocks in the isolation area 293 in descending order from approaching to away from the channel (as shown in FIG. 31 and FIG. 32) and is maintained. Then, the electric field voltage of the electrode blocks in the isolation area 293 is maintained, and the electric field voltage of the electrode blocks on the channel 1 291 is canceled. The first fluid that needs to be separated is cut off, which is shown in FIG. 33. Because the electric field voltage of the electrode blocks on the channel 1 291 is canceled, the first fluid in the isolation area 293 and the first fluid in the second area of the aperture each have a characteristic that the surface area tends to be smaller, and the surface energy is minimized. Therefore, the first fluid in the isolation area 293 and the first fluid in the second area of the aperture each are restored to the spherical coronal shape. In this case, the first fluid is disconnected in the channel 1 291, a part of the first fluid returns to the second area of the aperture, and the other part of the first fluid covers the isolation area 293. The electric field voltage of the electrode blocks of the isolation area 293 is maintained, and the electric field voltage is gradually applied from the outer circle to the inner circle to the drive electrodes on the periphery of the area corresponding to the aperture pattern surrounding the isolation area 293 in a manner (Manner 1) in which the aperture pattern can be formed without separating first fluid (as shown in FIG. 34 to FIG. 37).

It should be noted that, as shown in FIG. 33, in the step corresponding to FIG. 33, only the electric field voltage of the electrode blocks (namely, k7 to k10 in FIG. 29) that intersect the aperture pattern in the channel may be canceled. Because there are the electrode blocks (namely, k7 to k10 in FIG. 29) that intersect with the aperture pattern in the channel 1 291, even if electric field voltages of all electrode blocks (namely, k1 to k10 in FIG. 29) in the channel 1 291 are canceled in the step corresponding to FIG. 33, in a subsequent process of forming the aperture pattern, an electric field voltage further needs to be re-applied to electrode blocks that are in the channel 1 291 and that do not intersect with the aperture pattern (namely, k1 to k6 in FIG. 29). Therefore, in FIG. 33, only the electric field voltage of the electrode blocks corresponding to the grids (namely, k7 to k10 in FIG. 29) may be canceled.

With reference to FIG. 38 to FIG. 41, an aperture pattern generation procedure provided in an embodiment of this application includes the following steps.

101: Obtain a first aperture pattern drawn by a user.

Figures 37, 38:
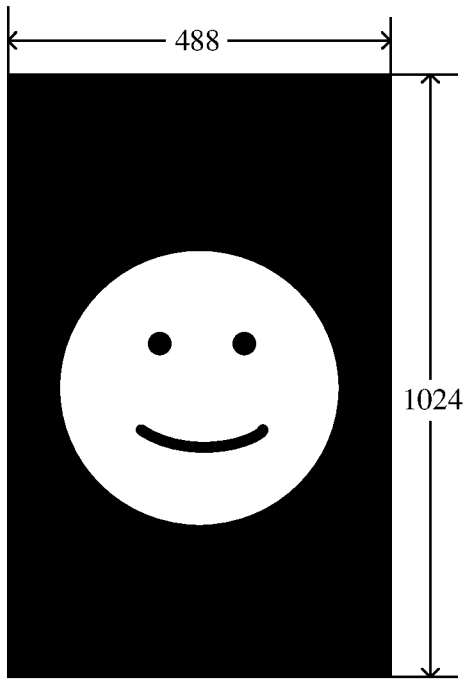
FIG. 37 is a schematic diagram 9 of voltage distribution of electrode blocks in a drive electrode array in an aperture control method according to an embodiment of this application.
FIG. 38 is a schematic flowchart 1 of generating an aperture pattern according to an embodiment of this application.

The user may draw, on a screen of a mobile phone, the to-be-loaded first aperture pattern. For example, the first aperture pattern is drawn by using a drawing application built in a system of the mobile phone, or the first aperture pattern is drawn in an application specially developed for the aperture provided in this embodiment of this application. In this case, pixel resolution of the aperture pattern is equal to pixel resolution of the screen of the mobile phone, for example, 1024×488, as shown in FIG. 38.

102: Adjust the first aperture pattern to a second aperture pattern that is equally proportional to resolution of a drive electrode array.

Figures 39, 40:
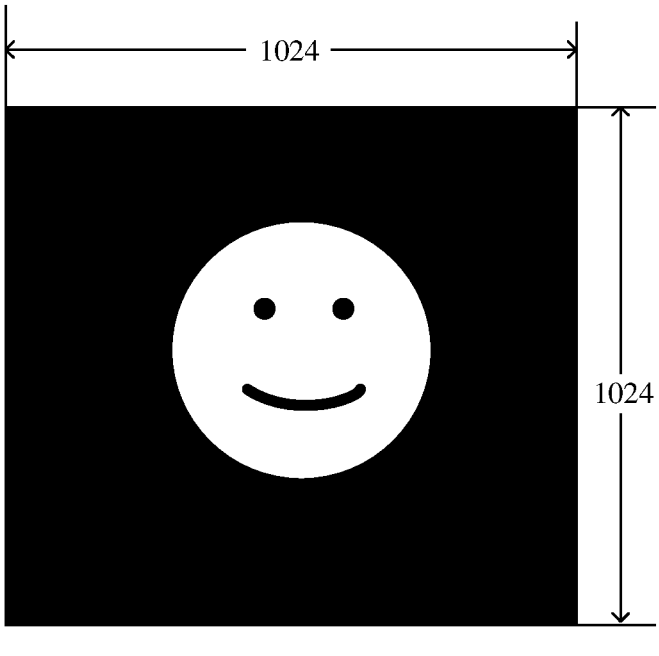
FIG. 39 is a schematic flowchart 2 of generating an aperture pattern according to an embodiment of this application.
FIG. 40 is a schematic flowchart 3 of generating an aperture pattern according to an embodiment of this application.

For example, the drawn first aperture pattern is adjusted to the second aperture pattern that is equally proportional to a transverse electrode block (pixel) and a longitudinal electrode block (pixel) of the drive electrode array by using the foregoing application. For example, the transverse electrode block of the drive electrode array is 16, and the longitudinal electrode block is 16. The application adjusts the first aperture pattern drawn by the mobile phone to the second aperture pattern of 1024×1024, as shown in FIG. 39. When the first aperture pattern is adjusted, the drawn first aperture pattern is kept not deformed, and longitudinal pixels are extended to two sides only by using a central image pixel of the first aperture pattern as a symmetric center, for example, 268 pixels are extended to the two sides. When the first aperture pattern is adjusted, newly added pixels are uniformly set to black. An image adjustment method is that extension is performed by copying an outer boundary value or by considering an image as a period of a two-dimensional periodic function; or adjustment is performed before the first pixel or after the last pixel of each dimension, or both.

103: Adjust a size of the second aperture pattern to generate a third aperture pattern, where an image size of the third aperture pattern keeps consistent with the resolution of the drive electrode array.

For example, the pixel of the second aperture pattern may be adjusted to 16×16. As shown in FIG. 40, the image size may be adjusted by using a nearest neighbor interpolation method, a bilinear interpolation method, or a bicubic interpolation method.

104: Convert the third aperture pattern into voltage information of an electric field voltage that needs to be applied to at least one electrode block on the drive electrode array.

An image of the third aperture pattern is a grayscale image, and binarization processing needs to be first performed on the third aperture pattern. In the binarization method, a grayscale threshold may be set. A pixel higher than the grayscale threshold is set to "1", and voltage information represented by "1" is that an electric field voltage is applied to an electrode block corresponding to the aperture pattern and is maintained valid. A pixel lower than the grayscale threshold is set to "0", and voltage information represented by "0" is that no voltage is applied to an electrode block corresponding to the aperture pattern, as shown in FIG. 41. The electric field voltage loaded on the electrode block corresponding to the aperture pattern is determined by a device circuit, for example, 5 V to 40 V.

FIG. 38 to FIG. 41 briefly describe the procedure of generating the user-defined aperture pattern. In some examples, several aperture patterns may be built in an electronic device for the user to select. For example, the several aperture patterns may be pre-stored in a memory, for example, may be aperture patterns in FIG. 13, FIG. 15, FIG. 17, FIG. 19, FIG. 21, FIG. 23, and FIG. 25. When the aperture needs to be controlled to form an aperture pattern, the built-in aperture patterns may be displayed on the display screen of the electronic device for the user to select. After selecting one aperture pattern, the user may control the aperture based on the foregoing example to generate the corresponding aperture pattern. For the foregoing solution in which the aperture patterns are built in the electronic device, the electronic device may further support a simple operation performed by the user on the selected aperture pattern, for example, a zoom operation, a rotation operation, a superposition operation, or a drag operation. Specifically, after selecting the aperture pattern shown in FIG. 13, the user may generate the aperture pattern shown in FIG. 17 by performing a zoom operation on the aperture pattern shown in FIG. 13. Alternatively, after the aperture pattern shown in FIG. 19 is selected, the aperture pattern is rotated by a specific angle through a rotation operation. Alternatively, after selecting two or more aperture patterns at the same time, the user superimposes the aperture patterns. For example, the user operates the electronic device to simultaneously select the aperture patterns in FIG. 17 and FIG. 23, and superimposes the aperture patterns in FIG. 17 and FIG. 23, so that a finally formed aperture pattern includes both the aperture patterns in FIG. 17 and FIG. 23. Alternatively, after selecting the aperture pattern shown in FIG. 17, the user operates the electronic device to drag a position of the aperture pattern in the aperture, for example, drag the aperture pattern from an upper right corner to a position such as a lower left corner or a center shown in FIG. 17.

Figure 42:
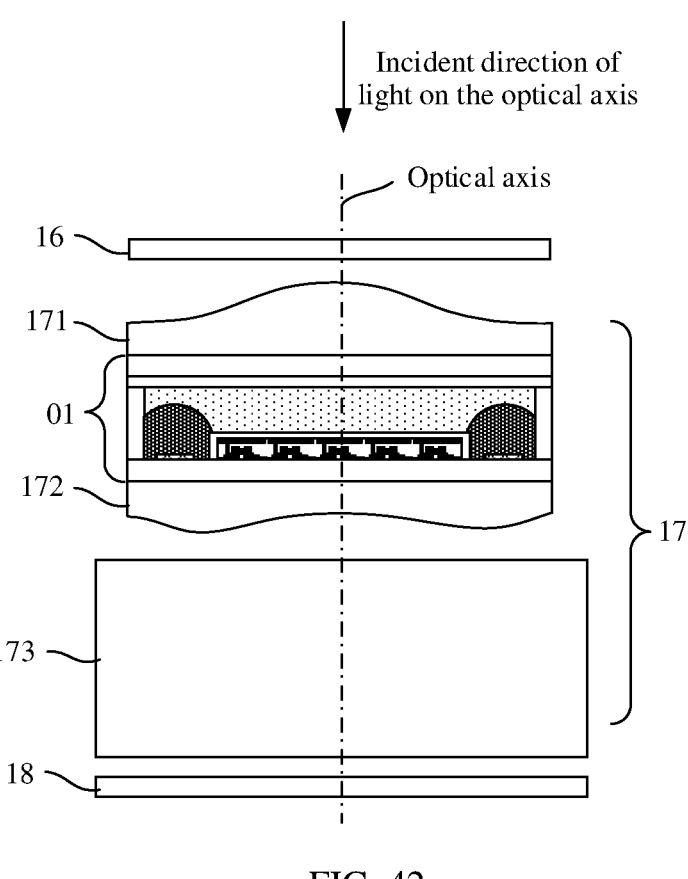
FIG. 42 is a schematic diagram of a structure of an imaging lens according to an embodiment of this application.

An embodiment of this application further provides an imaging lens, including at least one lens and the foregoing aperture. Specifically, as shown in FIG. 42, protective glass 16, a lens group 17, and a sensor 18 are sequentially included on an optical axis of the imaging lens based on an incident direction of light on the optical axis. The aperture 01 is disposed at one end of the lens group or between any two adjacent lenses in the lens group. As shown in FIG. 42, the lens group 17 includes a first lens 171, a second lens 172, and a third lens 173. FIG. 42 is merely an example. Based on different functions of the imaging lens, the lens group may include more or fewer lenses. For example, the third lens 173 may also be replaced with a combination of a plurality of lenses. As shown in FIG. 42, the aperture 01 is disposed between the first lens 171 and the second lens 172 that are in the lens group 17 and that are close to the protective glass 16.

Figure 43:
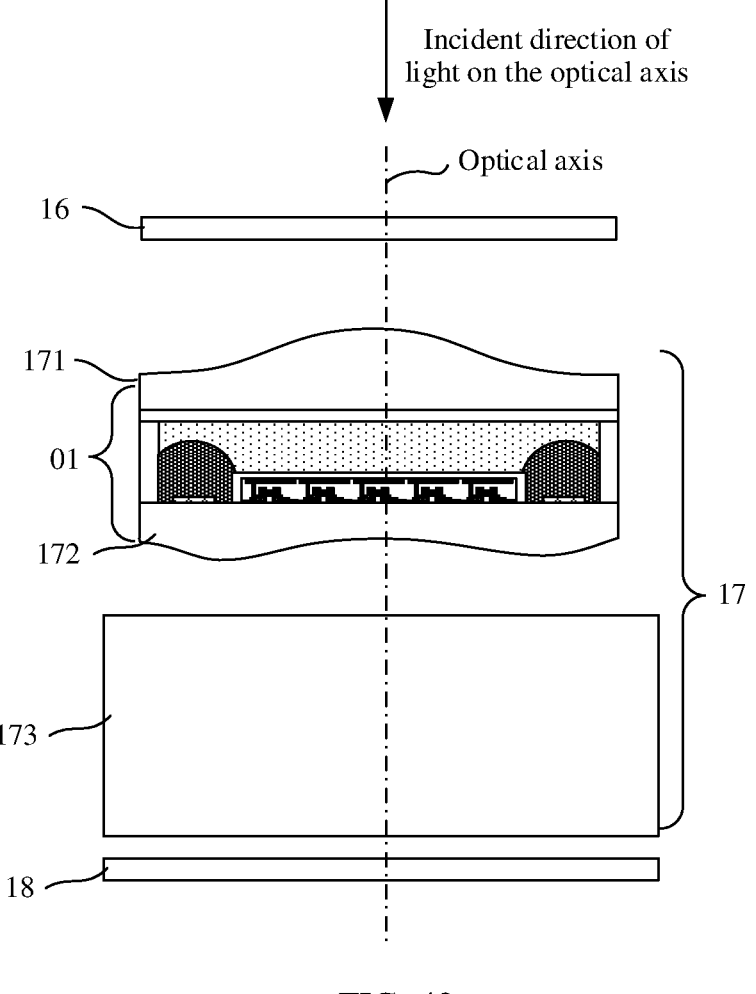
FIG. 43 is a schematic diagram of a structure of an imaging lens according to another embodiment of this application.
Figure 44:
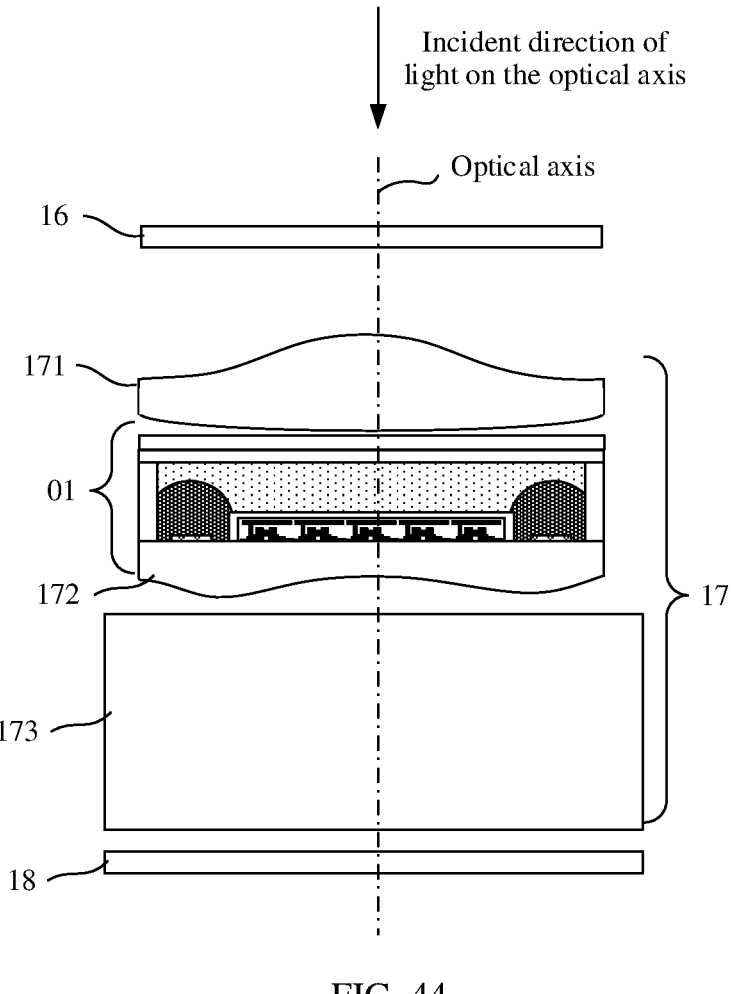
FIG. 44 is a schematic diagram of a structure of an imaging lens according to still another embodiment of this application.

In addition, any lens in the lens group 17 is used as a first substrate or a second substrate of the aperture 01. In this solution, a lens of the imaging lens is reused as the first substrate or the second substrate of the aperture, so that costs can be reduced, and transmittance of the imaging lens can be improved. A difference between FIG. 43 and FIG. 42 lies in that the first lens 171 is used as the first substrate of the aperture 01, and the second lens 172 is used as the second substrate of the aperture 01. When the lens of the lens group is reused as the first substrate or the second substrate of the aperture, the lens needs to have at least one plane. For example, in FIG. 43, two opposite surfaces of the first lens 171 and the second lens 172 are both planes. If only one of opposite surfaces of two adjacent lenses is a plane, only one lens may be reused as the first substrate or the second substrate of the aperture. As shown in FIG. 44, a surface that is of the first lens 171 and that faces the second lens 172 is a convex surface, and a surface that is of the second lens 172 and that faces the first lens 171 is a plane. In this case, only the second lens 172 is reused as the second substrate of the aperture. The foregoing mainly uses an example in which the aperture is disposed between the first lens 171 and the second lens 172 for description, and the aperture may also be disposed between other adjacent lenses.

Figure 45:
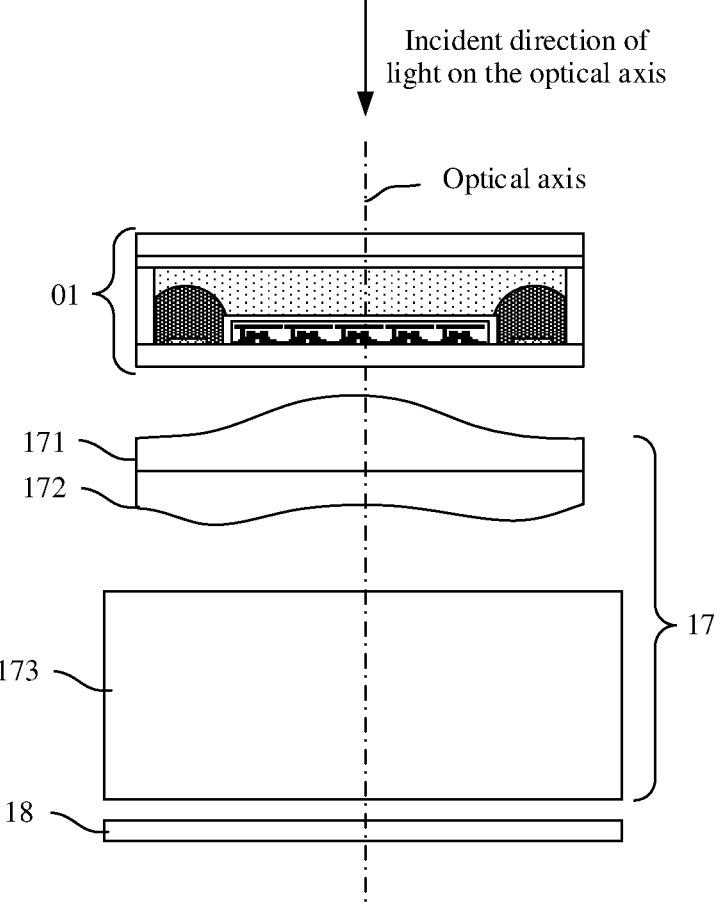
FIG. 45 is a schematic diagram of a structure of an imaging lens according to yet another embodiment of this application.

In addition, the aperture may be further disposed on a light ingress side at a front end of the imaging lens to protect the lens group. As shown in FIG. 45, the imaging lens sequentially includes the aperture 01, a lens group 17, and a sensor 18 in an optical axis direction.

It may be understood that, in the foregoing embodiments, the method and/or steps in the procedure of the aperture control method may be implemented by an aperture control apparatus, or may be implemented by a component (for example, a chip or a circuit) that can be used in the aperture control apparatus.

It may be understood that, to implement the foregoing functions, the aperture control apparatus includes corresponding hardware structures and/or software modules for performing the functions. A person of ordinary skill in the art should easily be aware that, in combination with the examples described in embodiments disclosed in this specification, units, algorithms and steps may be implemented by hardware or a combination of hardware and computer software in this application. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of this application.

In embodiments of this application, the aperture control apparatus may be divided into functional modules based on the foregoing method embodiments. For example, each functional module may be obtained through division based on a corresponding function, or two or more functions may be integrated into one processing module. The integrated module may be implemented in a form of hardware, or may be implemented in a form of a software functional module. It should be noted that, in embodiments of this application, division into modules is an example, and is merely logical function division. In an actual implementation, another division manner may be used.

Figure 46:
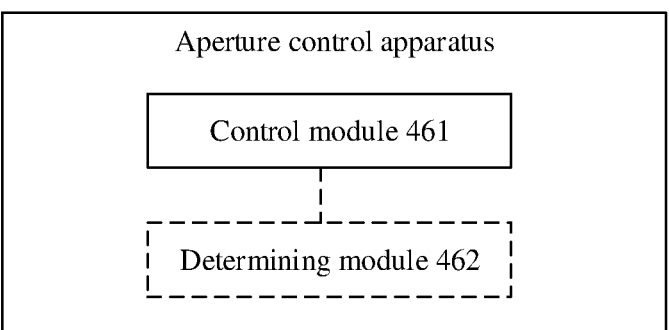
FIG. 46 is a schematic diagram of a structure of an aperture control apparatus according to an embodiment of this application.

FIG. 46 is a schematic diagram of an aperture control apparatus. The aperture control apparatus is configured to control the aperture provided in the foregoing embodiment. The aperture control apparatus includes: a control module 461, configured to apply an electric field voltage to some drive electrodes in a drive electrode array: move the first fluid to an area corresponding to the some drive electrodes to cover the area corresponding to the some drive electrodes; and form an aperture pattern in an area corresponding to other drive electrodes other than the some drive electrodes in the drive electrode array.

Optionally, no isolation area exists in the aperture pattern, the isolation area is an opaque area surrounded by the aperture pattern, and the some drive electrodes include drive electrodes on a periphery of the area corresponding to the aperture pattern in the drive electrode array. The control module 461 is specifically configured to: sequentially apply the electric field voltage to the some drive electrodes from a periphery of the drive electrode array to a center of the drive electrode array.

Optionally, an isolation area exists in the aperture pattern, and the isolation area is an opaque area surrounded by the aperture pattern. The some drive electrodes include drive electrodes on a periphery of the area corresponding to the aperture pattern in the drive electrode array, and drive electrodes corresponding to the isolation area. The control module 461 is specifically configured to: determine one channel in the drive electrode array based on the isolation area, where the channel is connected to the isolation area and the first fluid: sequentially apply the electric field voltage to drive electrodes on the channel from a periphery of the drive electrode array to a center of the drive electrode array: sequentially apply the electric field voltage to the drive electrodes corresponding to the isolation area from approaching the channel to away from the channel: cancel the electric field voltage of the drive electrodes on the channel; and sequentially apply the electric field voltage to the drive electrodes on the periphery of the area corresponding to the aperture pattern in the drive electrode array from the periphery of the drive electrode array to the center of the drive electrode array.

Optionally, the apparatus further includes a determining module 462, configured to determine the channel based on a distance between the first fluid and the isolation area, or determine the channel based on a distance between an edge that is of the aperture pattern and that is away from the isolation area and the isolation area.

All related content of each step involved in the foregoing method embodiments may be referenced to a function description of a corresponding functional module, and details are not described herein again.

Figure 47:
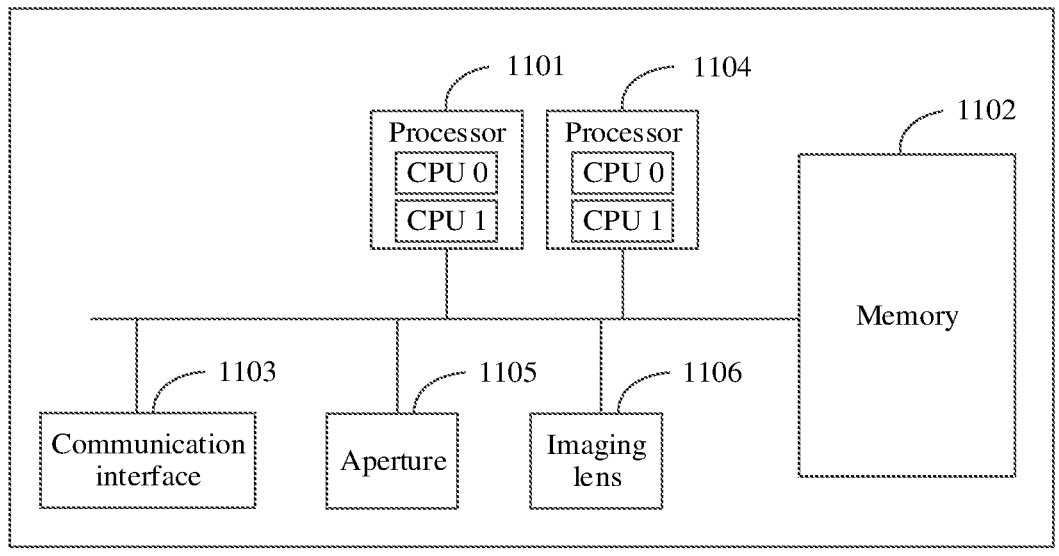
FIG. 47 is a schematic diagram of a structure of an electronic device according to still another embodiment of this application.

FIG. 47 is a schematic diagram of a hardware structure of an electronic device according to an embodiment of this application.

The electronic device includes the aperture 1105 or an imaging lens 1106. The electronic device further includes at least one processor (in FIG. 47, an example in which one processor 1101 is included is used for description) and at least one interface (in FIG. 47, an example in which one transmission interface 1103 is included is used for description). Optionally, the electronic device may further include at least one memory (in FIG. 47, an example in which one memory 1102 is included is used for description). Optionally, the electronic device may further include the at least one transmission interface 1103 (for example, the at least one transmission interface 1103 may be an interface circuit).

The aperture 1105, the imaging lens 1106, the processor 1101, the memory 1102, and the transmission interface 1103 are connected through a communication line. The communication line may include a path for transmitting information between the foregoing components.

The processor 1101 may be a general-purpose central processing unit (CPU), a microprocessor, an application-specific integrated circuit (ASIC), or one or more integrated circuits configured to control program execution of the solutions in this application. In a specific implementation, in an embodiment, the processor 1101 may also include a plurality of CPUs, and the processor 1101 may be a single-core (single-CPU) processor or a multi-core (multi-CPU) processor. The processor herein may be one or more devices, circuits, or processing cores configured to process data (for example, computer program instructions). For example, the processor 1101 may be the processor in FIG. 1a.

The memory 1102 may be an apparatus having a storage function. For example, the memory 1102 may be a read-only memory (ROM) or another type of static storage device that can store static information and instructions, a random access memory (RAM) or another type of dynamic storage device that can store information and instructions: or may be an electrically erasable programmable read-only memory (EEPROM), a compact disc read-only memory (CD-ROM) or another optical disk storage, an optical disc storage (including a compact disc, a laser disc, an optical disc, a digital versatile disc, a Blu-ray disc, or the like), a magnetic disk storage medium or another magnetic storage device, or any other medium that can be configured to carry or store expected program code in a form of an computer-executable instruction or a data structure and that can be accessed by a computer. However, this is not limited thereto. The memory 1102 may exist independently, and is connected to the processor 1101 through the communication line. Alternatively, the memory 1102 may be integrated with the processor 1101.

The memory 1102 is configured to store computer-executable instructions used to implement the solutions in this application, and execution is controlled by the processor 1101. Specifically, the processor 1101 is configured to execute the computer-executable instructions stored in the memory 1102, to implement the aperture control method in embodiments of this application.

Alternatively, optionally, in this embodiment of this application, the processor 1101 may perform a processing-related function in the aperture control method provided in the foregoing embodiments of this application, and the transmission interface 1103 is responsible for connecting to another device and transmitting a signal, for example, obtaining an aperture pattern from the another device. This is not specifically limited in this embodiment of this application.

Optionally, the computer-executable instructions in this embodiment of this application may also be referred to as application program code or computer program code. This is not specifically limited in this embodiment of this application.

In a specific implementation, in an embodiment, the processor 1101 may include one or more CPUs, for example, a CPU 0 and a CPU 1 in FIG. 47.

In a specific implementation, in an embodiment, the electronic device may include a plurality of processors, such as the processor 1101 and a processor 1104 in FIG. 47. Each of the processors may be a single-core processor (single-CPU) or may be a multi-core processor (multi-CPU). The processor herein may be one or more devices, circuits, and/or processing cores configured to process data (for example, computer program instructions).

The processor 1101 in the electronic device may invoke the computer-executable instructions stored in the memory 1102, so that the electronic device is enabled to perform the method in the foregoing method embodiments. Specifically, functions/implementation processes of the control module 461 and the determining module 462 in FIG. 46 may be implemented by the processor 1101 in the electronic device shown in FIG. 47 by invoking the computer-executable instructions stored in the memory 1102. Because the electronic device provided in this embodiment can perform the foregoing method, for technical effects that can be achieved by the electronic device, refer to the foregoing method embodiments. Details are not described herein again.

Optionally, an embodiment of this application further provides an aperture control apparatus (for example, the aperture control apparatus may be a chip or a chip system). The aperture control apparatus includes a processor, configured to implement the method in any one of the foregoing method embodiments. In a possible design, the aperture control apparatus further includes a memory. The memory is configured to store necessary program instructions and necessary data. The processor may invoke the program instructions stored in the memory to instruct the aperture control apparatus to perform the method in any one of the foregoing method embodiments. The memory may not be in the aperture control apparatus. When the aperture control apparatus is the chip system, the aperture control apparatus may include a chip, or may include a chip and another discrete device. This is not specifically limited in this embodiment of this application.

All or some of foregoing embodiments may be implemented through software, hardware, firmware, or any combination thereof. When a software program is used to implement embodiments, embodiments may be implemented completely or partially in a form of a computer program product. The computer program product includes one or more computer instructions. When the computer program instructions are loaded and executed on a computer, all or some of the procedures or functions in embodiments of this application are generated. The computer may be a general-purpose computer, a dedicated computer, a computer network, or another programmable apparatus. The computer instructions may be stored in a computer-readable storage medium, or transmitted from one computer-readable storage medium to another computer-readable storage medium. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like. In embodiments of this application, the computer may include the apparatus described above.

Although this application is described with reference to embodiments, in a process of implementing this application that claims protection, a person skilled in the art may understand and implement another variation of the disclosed embodiments by viewing the accompanying drawings, disclosed content, and appended claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce better effect.

Although this application is described with reference to specific features and embodiments thereof, it is clear that various modifications and combinations may be made to them without departing from the spirit and scope of this application. Correspondingly, the specification and accompanying drawings are merely example description of this application defined by the accompanying claims, and are considered as any of or all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. An aperture comprising a first substrate and a second substrate, wherein a first area and a second area are comprised between the first substrate and the second substrate, a drive electrode array on the second substrate is located in the first area, a common electrode on the second substrate is located in the second area, and a first fluid located in the second area extends over the common electrode;

the drive electrode array comprises transparent drive electrodes arranged in an array;

the aperture further comprises a second fluid; and the second fluid extends over the first fluid and the drive electrode array, wherein the first fluid and the second fluid fill an entire volume enclosed by a sidewall disposed between the first substrate and the second substrate, first hydrophobic layer, and one or more of a second hydrophobic layer, the second substrate, the drive electrode array, or the common electrode, wherein the first fluid is an opaque electrolyte, the second fluid is a transparent liquid, and the first fluid is insoluble with the second fluid, and further comprising a controller configured to:

apply an electric field voltage to some drive electrodes in the drive electrode array to move the first fluid to cover an area corresponding to the some drive electrodes and form an aperture pattern in an area corresponding to other drive electrodes, wherein an isolation area that is an opaque area surrounded by the aperture pattern exists in the aperture pattern; and determine a channel in the drive electrode array based on the isolation area and further based either on a distance between the first fluid and the isolation area or on a distance between an edge that is of the aperture pattern and that is away from the isolation area and the isolation area, wherein the channel is connected to the isolation area and the first fluid.

2. The aperture according to claim 1, wherein the aperture further comprises a first hydrophobic layer and a second hydrophobic layer, the first hydrophobic layer is disposed between the first substrate and the second fluid, and the second hydrophobic layer is disposed between the second fluid and the drive electrode array.

3. The aperture according to claim 2, wherein the aperture further comprises an insulation dielectric layer, and the insulation dielectric layer is disposed between the second hydrophobic layer and the drive electrode array.

4. The aperture according to claim 2, wherein the aperture further comprises a sidewall frame, and the sidewall frame is disposed between the first hydrophobic layer and the second substrate.

5. The aperture according to claim 1, wherein each drive electrode of the drive electrode array comprises an electrode block and a switch transistor, the drive electrode array further comprises gate leads and drain leads that are arranged in a cross manner, the electrode block is connected to a source of the switch transistor, a gate of the switch transistor is connected to a gate lead, and a drain of the switch transistor is connected to a drain lead.

6. The aperture according to claim 5, wherein an outer-facing edge of the electrode block of each drive electrode at an edge of the drive electrode array has a structure in which recesses and protrusions are arranged in an overlapping manner.

7. The aperture according to claim 5, wherein a gap between the electrode blocks is filled with an insulation coating, and a difference between a refractive index of the insulation coating and a refractive index of the electrode block is less than a preset value.

8. The aperture according to claim 2, further comprising a microstructure column, wherein the microstructure column is disposed on the second substrate, the microstructure column is located between the common electrode and the second hydrophobic layer, and the microstructure column is hydrophilic to the second fluid.

9. The aperture according to claim 1, further comprising a light shield layer, wherein the light shield layer is located in an area overlapping the second area; and the light shield layer is disposed on a side that is of the first substrate and that is away from the second substrate, or the light shield layer is disposed on a side that is of the second substrate and that is away from the first substrate.

10. The aperture according to claim 1, wherein the second fluid is oil liquid.

11. The aperture according to claim 1, wherein the drive electrode array comprises drive electrodes arranged in an M×N array, wherein M is a quantity of rows of the drive electrodes, N is a quantity of columns of the drive electrodes, and M and N are positive integers.

12. An aperture control method to control an aperture, wherein the aperture comprises a first substrate and a second substrate, a first area and a second area comprised between the first substrate and the second substrate, a drive electrode array on the second substrate located in the first area, a common electrode on the second substrate located in the second area, and a first fluid located in the second area extends over the common electrode; wherein the drive electrode array comprises transparent drive electrodes arranged in an array; and the aperture control method comprises:

applying an electric field voltage to some drive electrodes in the drive electrode array, moving the first fluid to an area corresponding to the some drive electrodes to cover the area corresponding to the some drive electrodes, and forming an aperture pattern in an area corresponding to other drive electrodes other than the some drive electrodes in the drive electrode array, wherein an isolation area that is an opaque area surrounded by the aperture pattern exists in the aperture pattern, and the some drive electrodes comprise drive electrodes on a periphery of the area corresponding to the aperture pattern in the drive electrode array and drive electrodes corresponding to the isolation area; and the applying an electric field voltage to some drive electrodes in the drive electrode array comprises:

determining a channel in the drive electrode array based on the isolation area and further based either on a distance between the first fluid and the isolation area or on a distance between an edge that is of the aperture pattern and that is away from the isolation area and the isolation area, wherein the channel is connected to the isolation area and the first fluid;

sequentially applying the electric field voltage to drive electrodes on the channel from a periphery of the drive electrode array to a center of the drive electrode array;

sequentially applying the electric field voltage to the drive electrodes corresponding to the isolation area from approaching the channel to away from the channel;

canceling the electric field voltage of the drive electrodes on the channel; and sequentially applying the electric field voltage to the drive electrodes on the periphery of the area corresponding to the aperture pattern in the drive electrode array from the periphery of the drive electrode array to the center of the drive electrode array.

13. The aperture control method according to claim 12, wherein no isolation area that is an opaque area surrounded by the aperture pattern exists in the aperture pattern, and the some drive electrodes comprise drive electrodes on a periphery of the area corresponding to the aperture pattern in the drive electrode array; and the applying an electric field voltage to some drive electrodes in the drive electrode array comprises:

sequentially applying the electric field voltage to the some drive electrodes from a periphery of the drive electrode array to a center of the drive electrode array.

14. An aperture control apparatus to control an aperture, wherein the aperture comprises a first substrate and a second substrate, a first area and a second area comprised between the first substrate and the second substrate, a drive electrode array on the second substrate located in the first area, a common electrode on the second substrate located in the second area, and a first fluid located in the second area extends over the common electrode; wherein the first fluid and a second fluid fill an entire volume enclosed by a sidewall disposed between the first substrate and the second substrate, first hydrophobic layer, and one or more of a second hydrophobic layer, the second substrate, the drive electrode array, or the common electrode, wherein the drive electrode array comprises transparent drive electrodes arranged in an array; and the aperture control apparatus comprises at least one processor and a memory, wherein the at least one processor is coupled to the memory, and the at least one processor is configured to enable the aperture control apparatus to perform operations comprising:

applying an electric field voltage to some drive electrodes in the drive electrode array, moving the first fluid to an area corresponding to the some drive electrodes to cover the area corresponding to the some drive electrodes, and forming an aperture pattern in an area corresponding to other drive electrodes other than the some drive electrodes in the drive electrode array, wherein an isolation area that is an opaque area surrounded by the aperture pattern exists in the aperture pattern; and determining a channel in the drive electrode array based on the isolation area and further based either on a distance between the first fluid and the isolation area or on a distance between an edge that is of the aperture pattern and that is away from the isolation area and the isolation area, wherein the channel is connected to the isolation area and the first fluid;

sequentially applying the electric field voltage to drive electrodes on the channel from a periphery of the drive electrode array to a center of the drive electrode array;

sequentially applying the electric field voltage to the drive electrodes corresponding to the isolation area from approaching the channel to away from the channel;

canceling the electric field voltage of the drive electrodes on the channel; and sequentially applying the electric field voltage to the drive electrodes on the periphery of the area corresponding to the aperture pattern from the periphery of the drive electrode array to the center of the drive electrode array.

15. The aperture control apparatus according to claim 14, wherein the second fluid covers the first fluid and the drive electrode array, wherein the first fluid is an opaque electrolyte, the second fluid is a transparent liquid, and the first fluid is insoluble with the second fluid.

* * * * *